(12) United States Patent
Guo et al.

(10) Patent No.: US 11,115,103 B2
(45) Date of Patent: Sep. 7, 2021

(54) METHOD AND APPARATUS FOR BEAM MEASUREMENT AND MANAGEMENT IN WIRELESS SYSTEMS

(71) Applicant: Samsung Electronics Co., Ltd., Suwon-si (KR)

(72) Inventors: Li Guo, Allen, TX (US); Young-Han Nam, Plano, TX (US); Yang Li, Plano, TX (US); Boon Ng, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/575,206

(22) Filed: Sep. 18, 2019

(65) Prior Publication Data

US 2020/0014454 A1 Jan. 9, 2020

Related U.S. Application Data

(63) Continuation of application No. 15/672,152, filed on Aug. 8, 2017, now Pat. No. 10,505,618.
(Continued)

(51) Int. Cl.
*H04L 1/00* (2006.01)
*H04B 7/06* (2006.01)
(Continued)

(52) U.S. Cl.
CPC ........... *H04B 7/0695* (2013.01); *H04B 7/024* (2013.01); *H04B 7/0408* (2013.01);
(Continued)

(58) Field of Classification Search
CPC ..... H04W 24/08; H04W 24/10; H04W 88/08; H04W 84/12; H04W 16/28;
(Continued)

(56) References Cited

U.S. PATENT DOCUMENTS

| 2013/0215844 | A1* | 8/2013 | Seol | H04B 7/0695 370/329 |
| 2013/0237218 | A1* | 9/2013 | Li | H04W 48/16 455/434 |

(Continued)

OTHER PUBLICATIONS

European Patent Office, Communication pursuant to Article 94(3) EPC regarding Application No. 17839828.5, dated Feb. 2, 2021, 6 pages.

(Continued)

*Primary Examiner* — Atique Ahmed

(57) ABSTRACT

A method of user equipment (UE) for beam management in a wireless communication system comprises receiving, from a base station (BS), at least two groups of Tx beams comprising transmit (Tx) signals generated from different antenna panels, the at least two groups of Tx beams transmitted through reference signals; receiving, from the BS, configuration information including a selection constraint for the at least two groups of Tx beams; measuring, based on the configuration information, at least one beam from each of the at least two groups of beams; selecting at least one Tx beam from each of the at least two groups and a same Rx beam set as an Rx beam corresponding to respective selected Tx beams; and transmitting, to the BS, a reporting message including information of the selected Tx beams and the selected same Rx beam set corresponding to the Rx beam.

32 Claims, 20 Drawing Sheets

Related U.S. Application Data

(60) Provisional application No. 62/373,118, filed on Aug. 10, 2016, provisional application No. 62/442,176, filed on Jan. 4, 2017.

(51) Int. Cl.
*H04B 7/0456* (2017.01)
*H04B 7/024* (2017.01)
*H04B 7/08* (2006.01)
*H04B 17/309* (2015.01)
*H04B 7/0408* (2017.01)
*H04W 16/28* (2009.01)
*H04W 72/04* (2009.01)
*H04W 88/06* (2009.01)

(52) U.S. Cl.
CPC ......... *H04B 7/0456* (2013.01); *H04B 7/0619* (2013.01); *H04B 7/088* (2013.01); *H04B 17/309* (2015.01); *H04W 16/28* (2013.01); *H04W 72/046* (2013.01); *H04W 88/06* (2013.01)

(58) Field of Classification Search
CPC .. H04W 72/046; H04W 88/06; H04B 7/0695; H04B 17/309; H04B 7/024; H04B 7/0408; H04B 7/0456; H04B 7/0619; H04B 7/088; H04L 5/0048
See application file for complete search history.

(56) References Cited

U.S. PATENT DOCUMENTS

| | | | | |
|---|---|---|---|---|
| 2013/0286960 | A1* | 10/2013 | Li | H04W 72/042 370/329 |
| 2014/0148182 | A1* | 5/2014 | Jeong | H04L 5/0094 455/452.1 |
| 2014/0177607 | A1* | 6/2014 | Li | H04W 52/42 370/336 |
| 2014/0198681 | A1* | 7/2014 | Jung | H04B 7/088 370/252 |
| 2015/0382205 | A1* | 12/2015 | Lee | H04L 5/0048 370/329 |
| 2016/0353424 | A1* | 12/2016 | Stirling-Gallacher | H04B 7/0626 |
| 2017/0149480 | A1* | 5/2017 | Kakishima | H04B 7/024 |
| 2018/0034531 | A1* | 2/2018 | Sadiq | H04W 72/046 |

OTHER PUBLICATIONS

Korean Intellectual Property Office, Office Action dated Jun. 30, 2021 regarding Application No. 10-2019-7006628, 11 pages.

* cited by examiner

METHOD AND APPARATUS FOR BEAM MEASUREMENT AND MANAGEMENT IN WIRELESS SYSTEMS

CROSS-REFERENCE TO RELATED APPLICATIONS AND CLAIM OF PRIORITY

This application is a continuation of U.S. Non-Provisional patent application Ser. No. 15/672,152 filed Aug. 8, 2017 and entitled "Method and Apparatus for Beam Measurement and Management in Wireless Systems," and claims priority to U.S. Provisional Patent Application No. 62/373,118 filed Aug. 10, 2016 and entitled "Method and Apparatus for Beam Measurement and Management in Wireless Systems" and U.S. Provisional Patent Application No. 62/442,176 filed Jan. 4, 2017 and entitled "Method and Apparatus for Beam Measurement, Reporting and Indication in Next Generation Wireless Systems." The content of the above-identified patent documents is incorporated herein by reference.

TECHNICAL FIELD

The present application relates generally to advanced communication systems. More specifically, this disclosure relates to beam measurement and management in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for beam management in a wireless communication system is provided. The UE includes a transceiver configured to receive, from a base station (BS), at least two groups of Tx beams comprising transmit (Tx) signals generated from different antenna panels, the at least two groups of Tx beams transmitted through reference signals; and receive, from the BS, configuration information including a selection constraint for the at least two groups of Tx beams. The UE further includes at least one processor operatively coupled to the transceiver, the at least one processor configured to measure, based on the configuration information, at least one Tx beam from each of the at least two groups of Tx beams; and select at least one Tx beam from each of the at least two groups and a same Rx beam set as an Rx beam corresponding to respective selected Tx beams. The UE is further includes the transceiver configured to transmit, to the BS, a reporting message including information of the selected Tx beams and the selected same Rx beam set corresponding to the Rx beam.

In another embodiment, a base station (BS) for beam management in a wireless communication system is provided. The BS includes at least one processor and a transceiver operatively coupled to the at least one processor, the transceiver configured to transmit, to a user equipment (UE) for measurement, at least two groups of Tx beams comprising transmit (Tx) signals generated from different antenna panels, the at least two groups of Tx beams transmitted through reference signals; transmit, to the UE, configuration information including a selection constraint for the at least two groups of Tx beams; and receive, from the UE, a reporting message including information of selected Tx beams and a same receive (Rx) beam set. The selected Tx beams are selected by the UE from each of the at least two groups of Tx beams, respectively; and wherein the selected same Rx beam set corresponds to measured Tx beams from the at least two groups of Tx beams, respectively.

In yet another embodiment, a method of user equipment (UE) for beam management in a wireless communication system is provided. The method comprises receiving, from a base station (BS), at least two groups of Tx beams comprising transmit (Tx) signals generated from different antenna panels, the at least two groups of Tx beams transmitted through reference signals; receiving, from the BS, configuration information including a selection constraint for the at least two groups of Tx beams; measuring, based on the configuration information, at least one Tx beam from each of the at least two groups of Tx beams; selecting at least one Tx beam from each of the at least two groups and a same Rx beam set as an Rx beam corresponding to respective selected Tx beams; and transmitting, to the BS, a reporting message including information of the selected Tx beams and the selected same Rx beam set corresponding to the Rx beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation (REF 1);" 3GPP TS 36.212 v13.0.0, "E-UTRA, Multiplexing and Channel coding; (REF 2);" 3GPP TS 36.213 v13.0.0, "E-UTRA, Physical Layer Procedures (REF 3);" 3GPP TS 36.321 v13.0.0, "E-UTRA, Medium Access Control (MAC) protocol specification (REF 4);" and 3GPP TS 36.331 v13.0.0, "Radio Resource Control (RRC) Protocol Specification (REF 5)."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
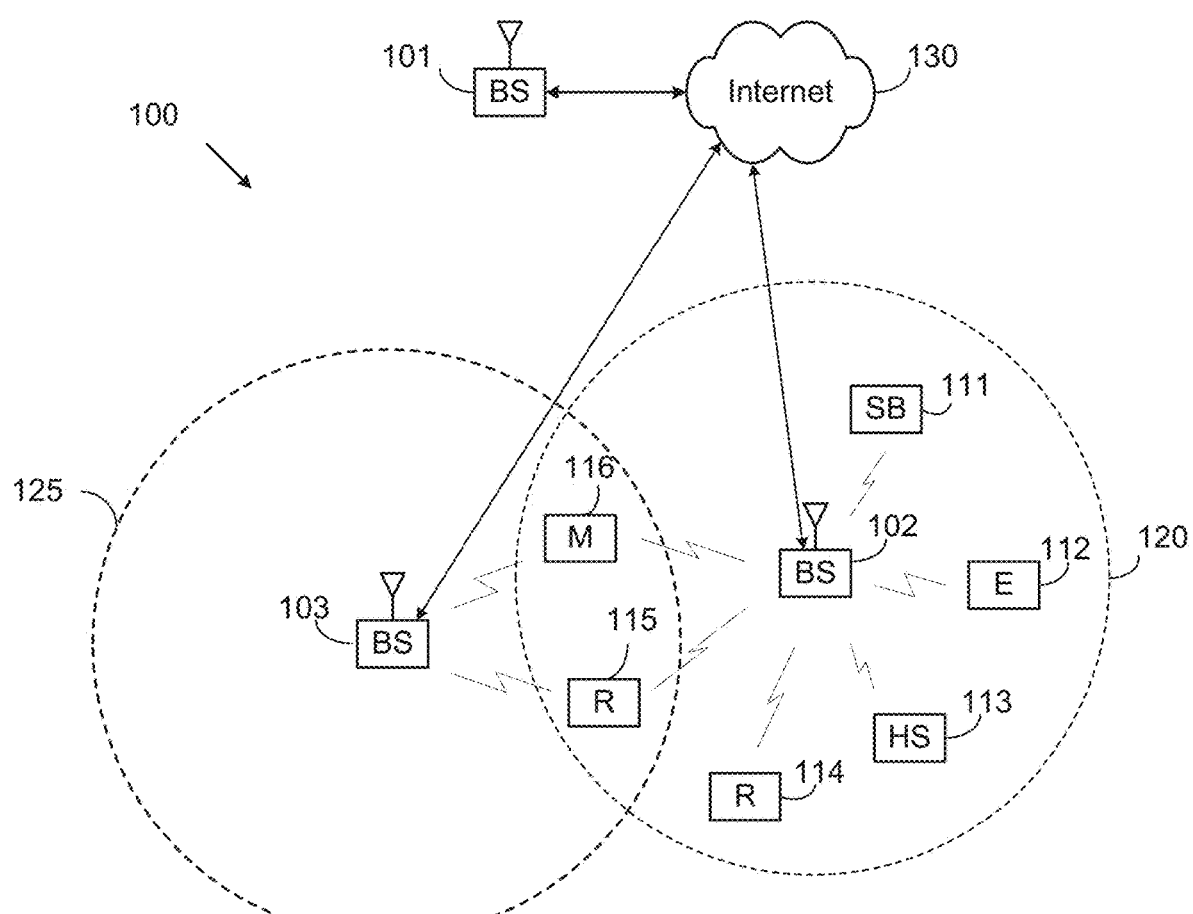
FIG. 1 illustrates an example wireless network according to embodiments of the present disclosure.
Figure 2:
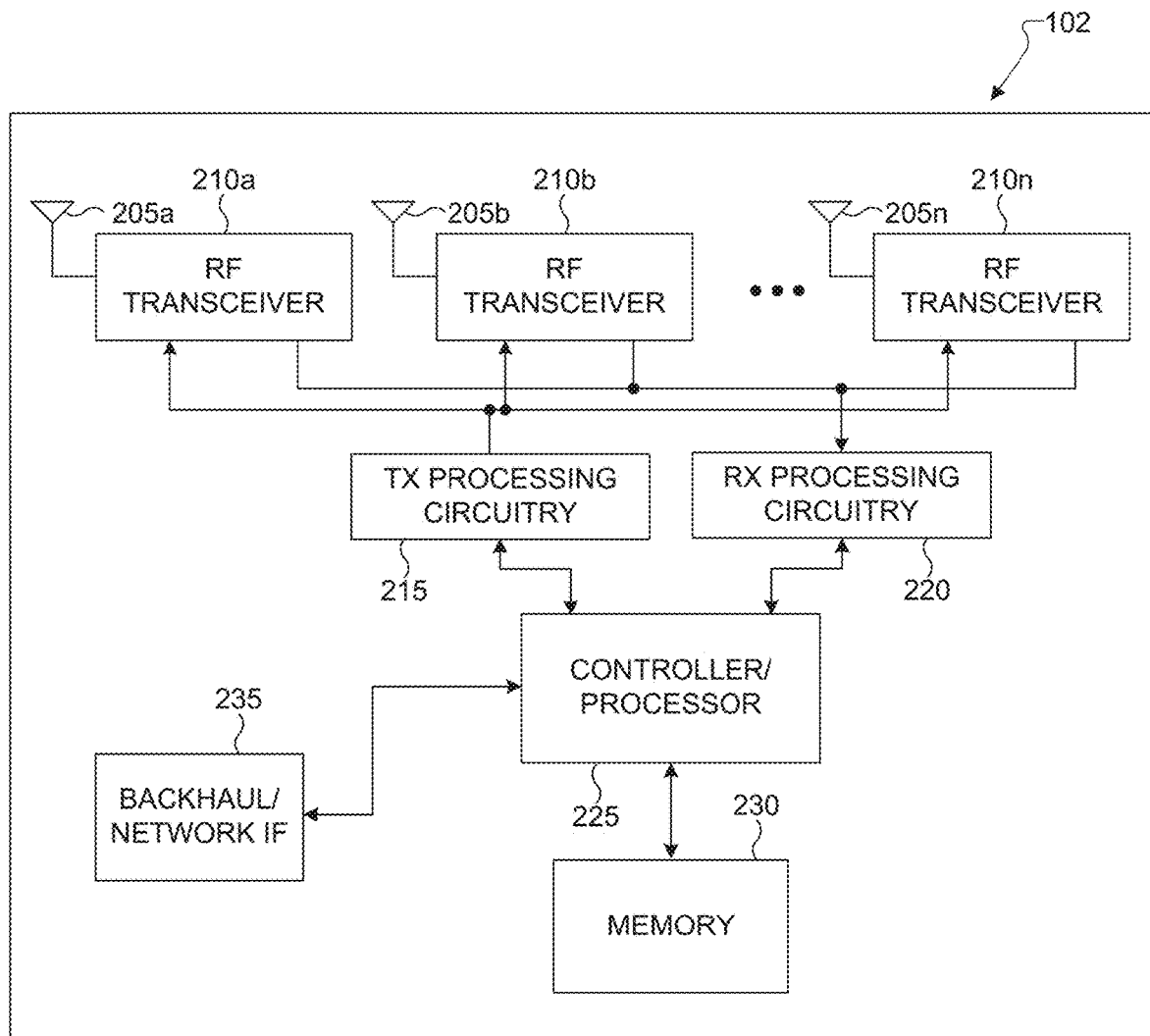
FIG. 2 illustrates an example eNB according to embodiments of the present disclosure.
Figure 3:
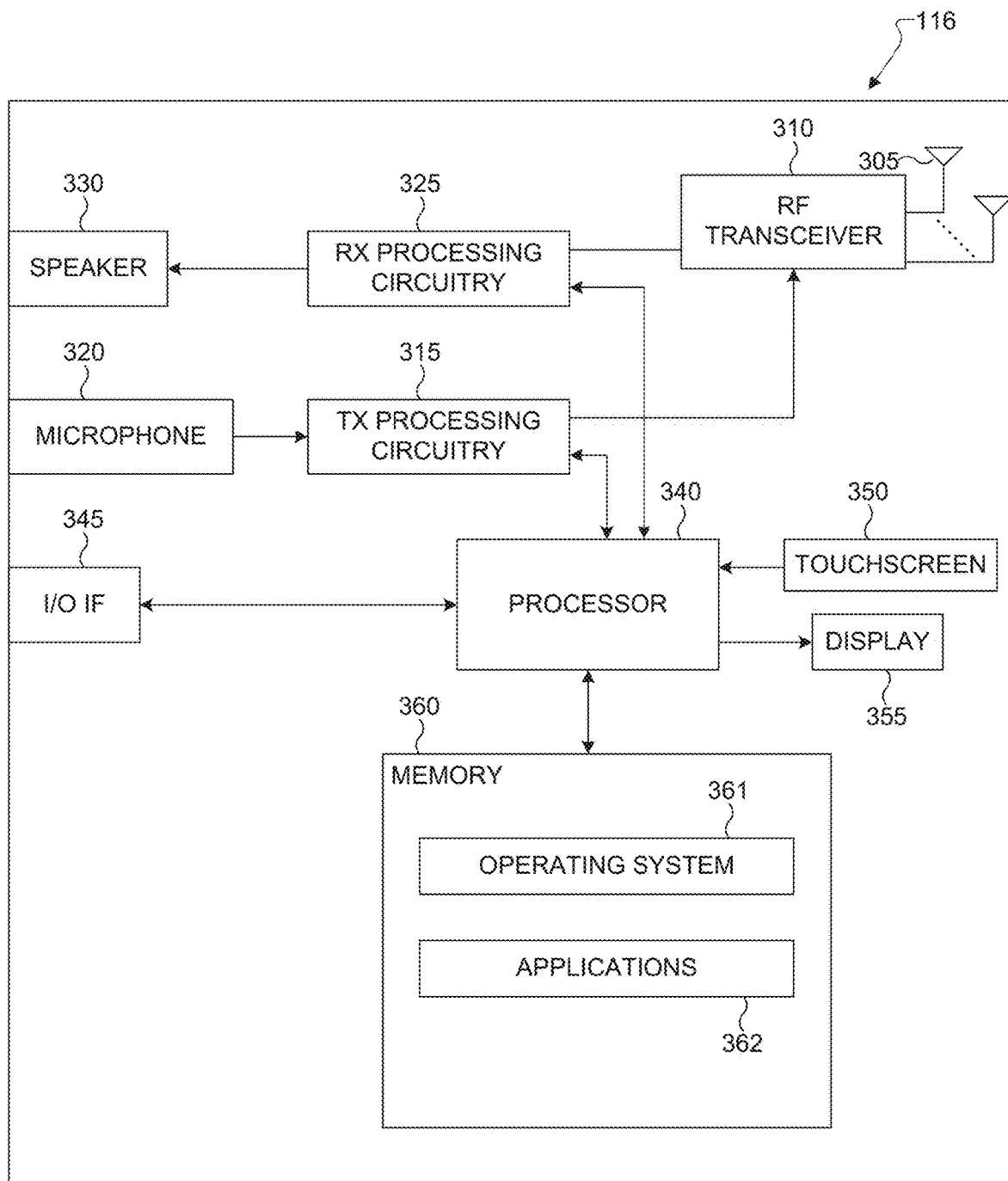
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting groups of beams comprising Tx signals corresponding to different antenna panels using MIMO communication techniques and transmitting a selection constraint for the groups of beams.

In some embodiments, the RF transceiver 210a-201n is capable of receiving a reporting message from a UE, including information of the beam received at the UE. In such embodiments, the UE measures the beam from groups of beams using the configuration information. In such embodiments, an Rx beam in the same Rx beam set, for each of the at least two groups, is selected by the UE. The selected Rx beam corresponds to the measured beams by the UE.

In such embodiments, the Rx beam set comprises at least one Rx beam corresponding to either an antenna penal or an antenna array, and the information includes different quality of the Tx signals. In such embodiments, the different quality of the Tx signal is classified into at least two groups based on the quality of the signals. Each beam corresponding to different antenna panel or antenna array is transmitted on the same OFDM symbol.

In some embodiments, the RF transceiver 210a-201n is capable of transmitting the Tx signals using TRPs including multiple panels, receiving the reporting message including information of the Tx signals. In such embodiments, a JT, a DPS, or an interference coordination is applied to the TRPs.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 is capable of includes at least one microprocessor or microcontroller. As described in more detail below, the eNB 102 may include circuitry, programing, or a combination thereof for processing of CSI reporting on PUCCH. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving groups of beams comprising transmit Tx signals generated from different antenna panels and receiving configuration information including a selection constraint for the groups of beams. In such embodiments, the groups of beams transmitted using MIMO communication techniques.

In some embodiments, the RF transceiver 310 is capable of transmitting a reporting message including information of the beam received at the UE.

In such embodiments, the information includes different quality of the Tx signals each of which corresponds to different group and each beam of the groups of beams corresponds to different antenna panel, each beam being received on a same OFDM symbol.

In some embodiments, the RF transceiver 310 is capable of receiving the Tx signals from TRPs comprising multiple panels and receiving the reporting message including information of the Tx signals associated with the TRPs. In such embodiments, a JT, a DPS, or an interference coordination is applied to among TRPs.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of measuring beam from groups of beams and selecting an Rx beam in a same Rx beam set. In such embodiments, the selected Rx beam corresponds to respective measured beams.

In some embodiments, the processor 340 is also capable of selecting the beam from the groups of beams based on the selection constraint configured by a network and identifying groups each of which includes different quality of the Tx signals.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
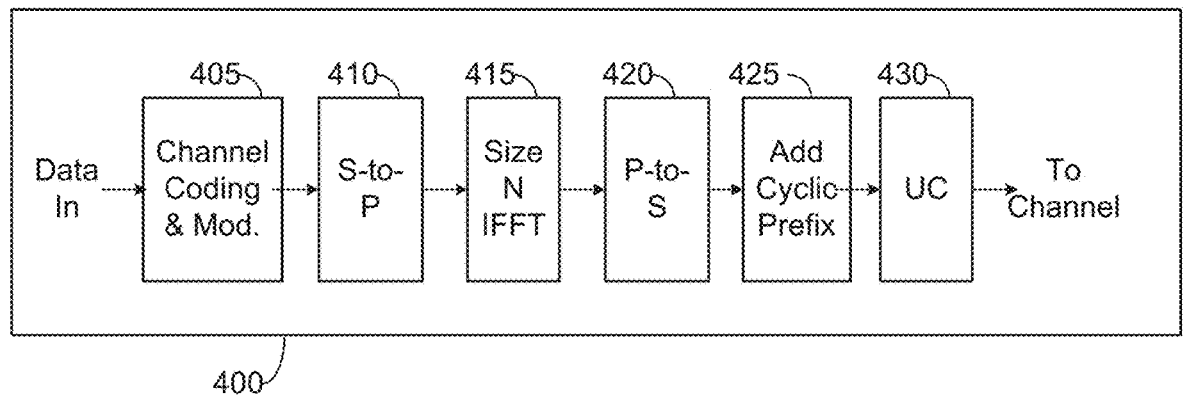
FIG. 4A illustrates an example high-level diagram of an orthogonal frequency division multiple access transmit path according to embodiments of the present disclosure.
Figure 4B:
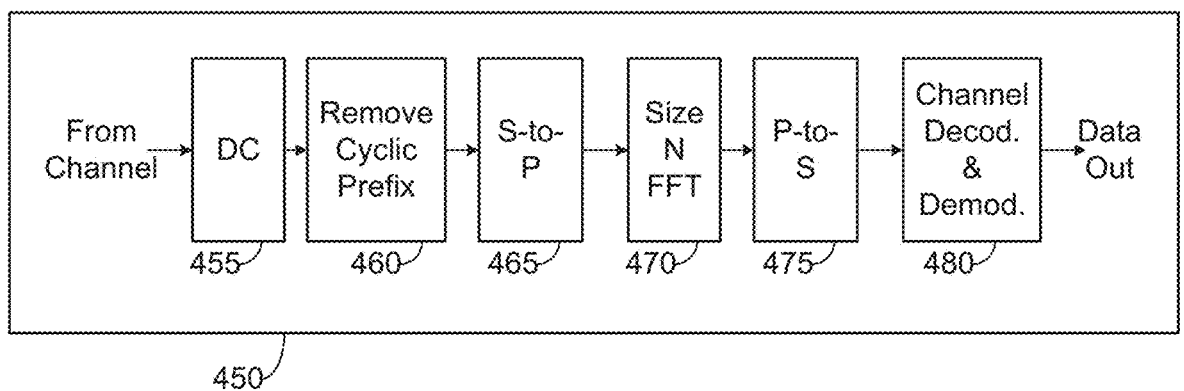
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission scheme wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE's data transmission/reception.

Figure 5:
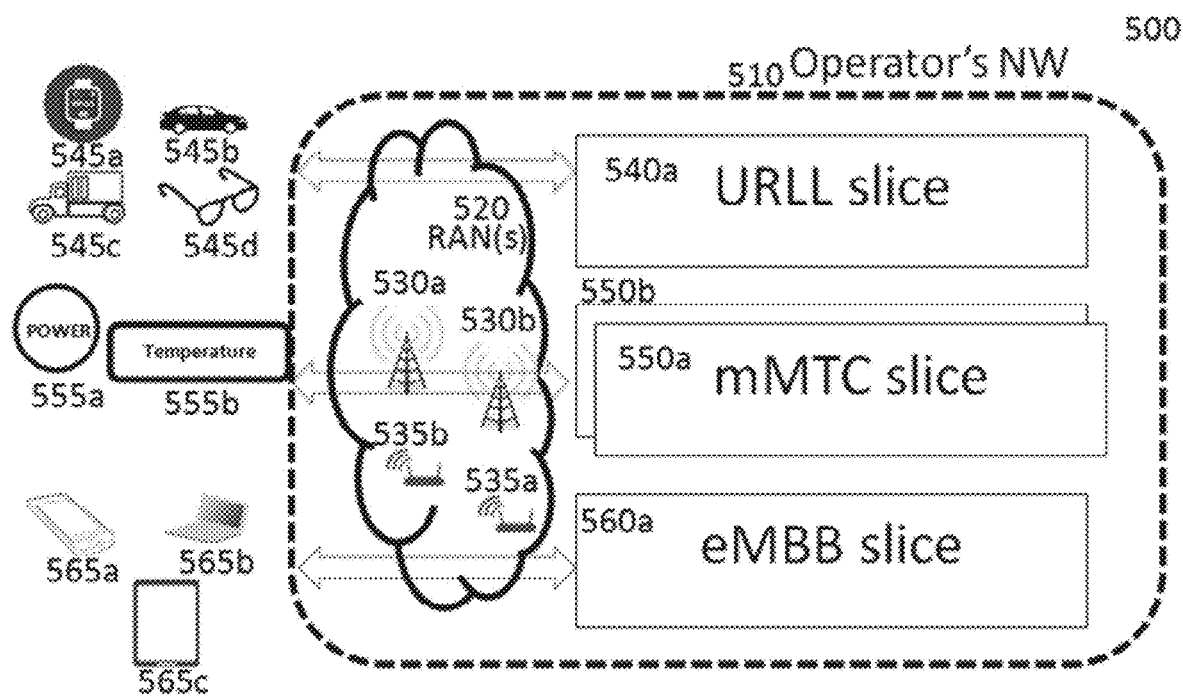
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
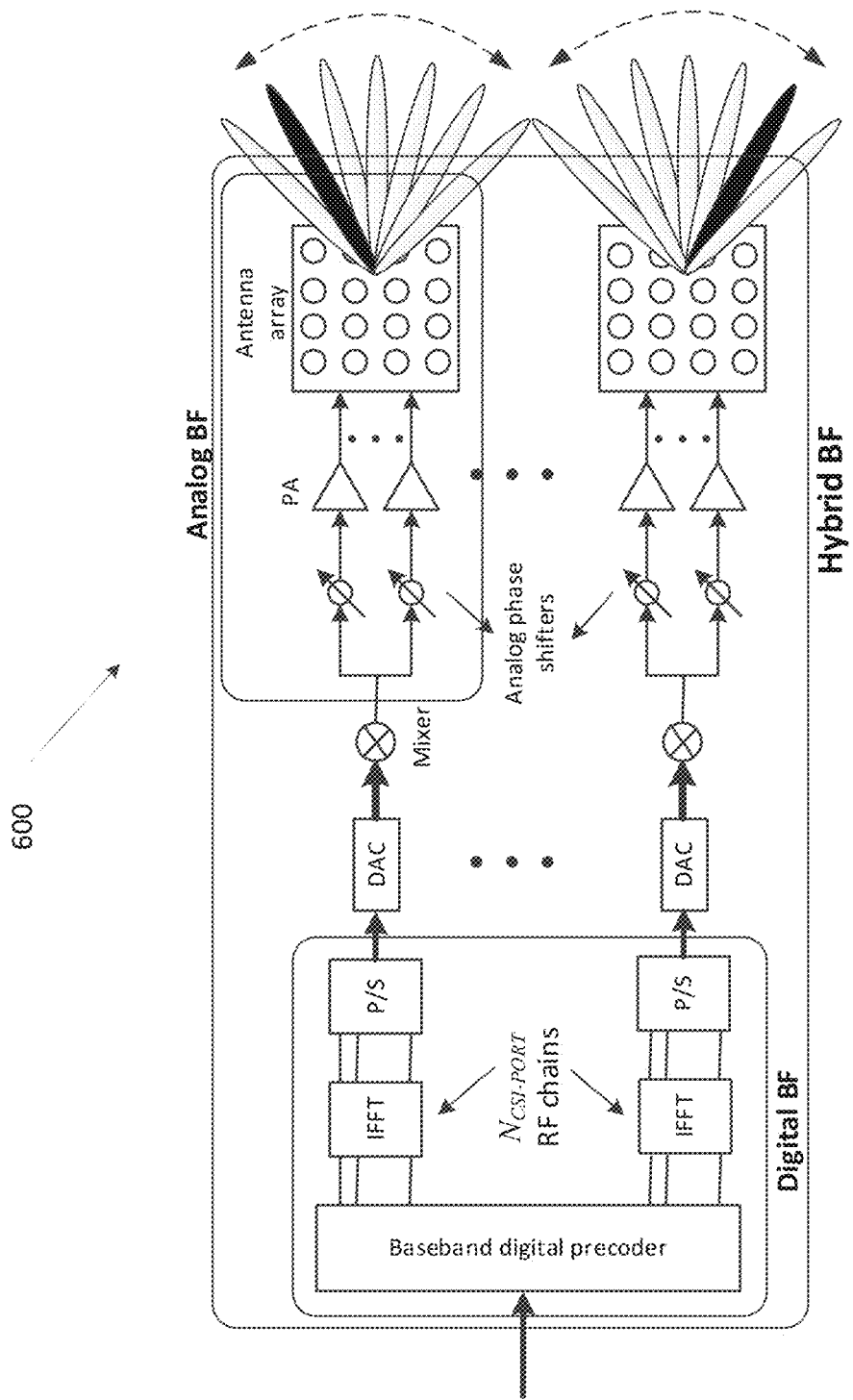
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 6. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across symbols or subframes.

An eNB could utilize one or multiple transmit beams to cover the whole area of one cell. The eNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for eNB to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the eNB may form a number of transmit beams, each providing coverage over a region narrower than the overall coverage region, but providing the transmit power amplification sufficient to overcome the higher signal propagation loss due to the usage of higher transmit signal carrier frequencies.

Figure 7:
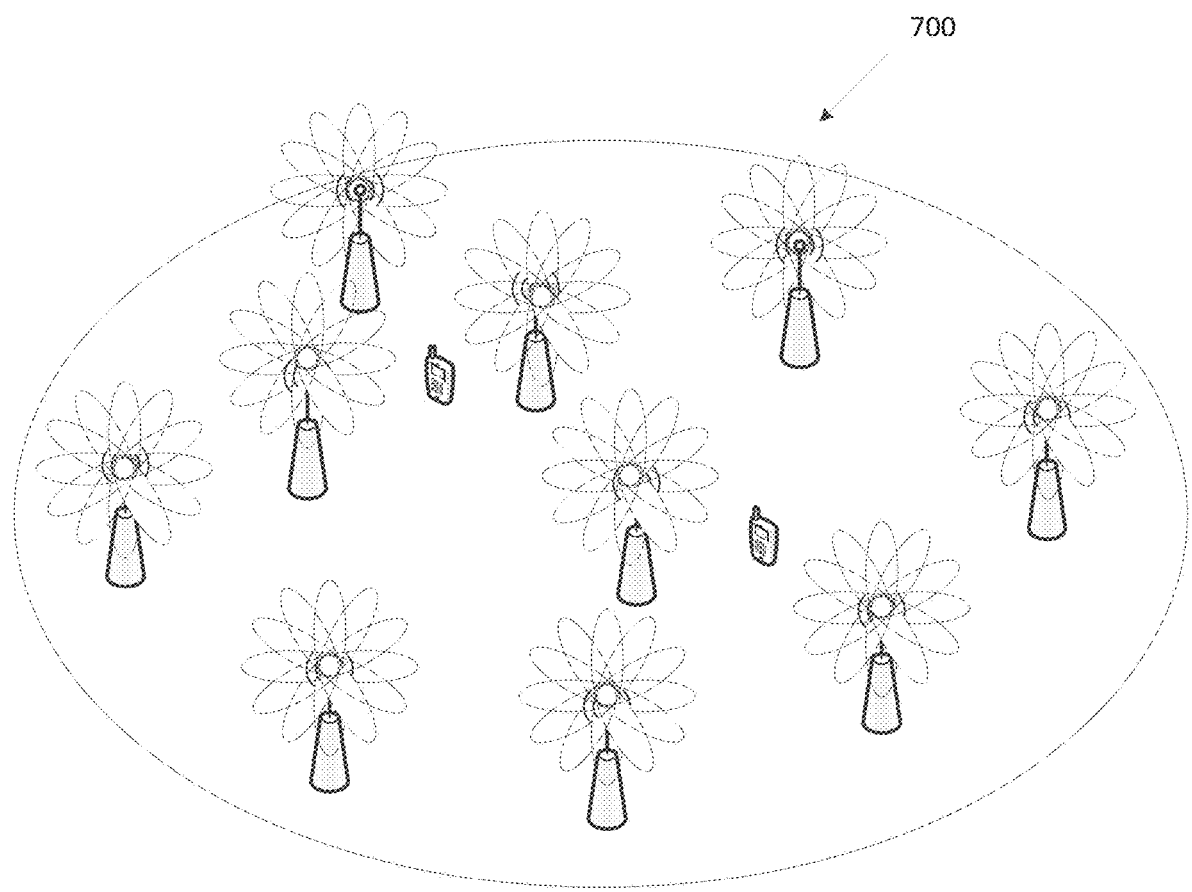
FIG. 7 illustrates an example analog beam forming according to embodiments of the present disclosure.

FIG. 7 illustrates an example analog beam forming 700 according to embodiments of the present disclosure. An embodiment of the analog beam forming 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

The 5G system is generally a multi-beam based system. In such a system, multiple beams are used to cover one coverage area. An example for illustration is shown in FIG. 7. As shown in FIG. 7, one gNB has one or more transmission/reception points (TRPs). Each TRP uses one or more analog beams to cover some area. To cover one UE in one particular area, the gNB use one or more analog beams to transmit and receive the signal to and from that UE. The gNB and the UE need to determine the beam(s) used for their connection. When the UE moves within one cell coverage area, the beam(s) used for this UE may be changed and switched. It was agreed in 3GPP NR RAN1 meetings that the operation of managing those beams are L1 and L2 operation.

In the present disclosure, mobility and beam management method are proposed for next generation cellular systems.

In the present disclosure, an initial access method for next generation cellular systems is proposed.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Figure 8:
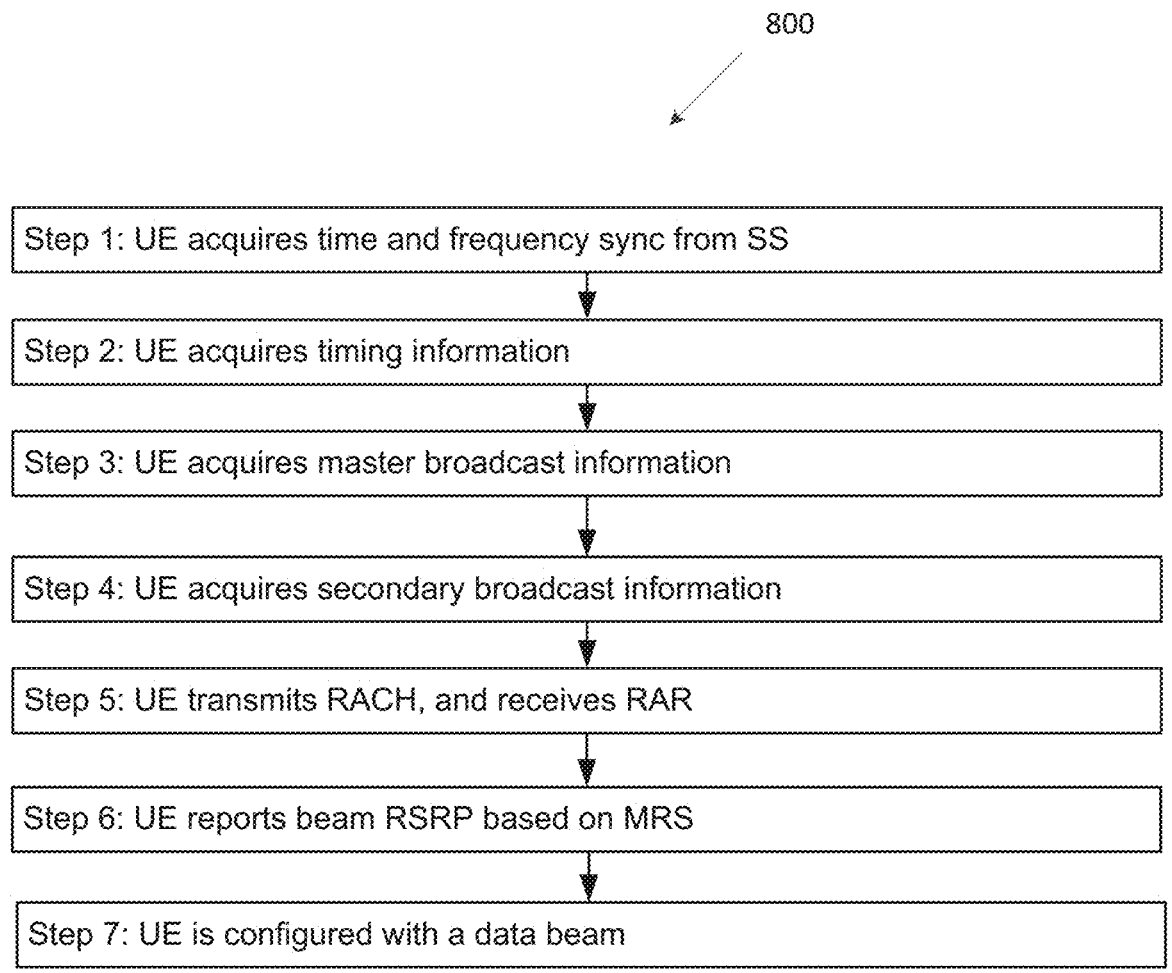
FIG. 8 illustrates an example high-level initial access and beam association procedure according to embodiments of the present disclosure.

FIG. 8 illustrates an example high-level initial access and beam association procedure 800 according to embodiments of the present disclosure. An embodiment of the high-level initial access and beam association procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

As shown in FIG. 8, 7 steps of the high-level initial access and beam association procedure are performed according to some embodiments of the present disclosure. In the multi-beam based approach, beam sweeping is applied on initial access signal/information, up until a certain step. The UE applies blind decoding on multiple time-frequency resources in a certain period, to detect/acquire those signals/channels/information for which beam sweeping is applied. The UE's blind decoding and eNB's beam sweeping incurs computational complexity and resource overhead, and hence the use of these mechanisms may be minimized. In this case, information that can be exchanged between the UE and eNB during the initial access steps relying on the beam sweeping is likely to be limited.

For more spectrally efficient information exchange (with a higher or best achievable SINR), the UE needs to be configured (or associated) with a Tx beam for UL/DL data reception. When the UE has multiple Rx beams, the UE also need to figure out a best beam pair (i.e., a Tx beam and a Rx beam) for the data reception.

In some embodiments, the beam configuration is done in two levels—coarse-beam alignment and fine-beam alignment. Up until Step 4 in FIG. 8, the eNB applies beam sweeping, and no beam is associated to a UE yet. At Step 5, the UE transmits random access channel (RACH) and receives RAR (random access response). Differently from Step 1-4, the RAR is unicast information. To achieve better spectral efficiency, it would be desirable if the unicast information is transmitted not purely relying on beam sweeping mechanism. One possibility is to perform a coarse beam association between a Tx beam and a Rx beam, e.g., via a special RACH resource selection method.

In one example, the UE is configured to measure RSRPs of multiple cell-specific first-level beam measurement reference signals (MRS-1) resources indexed by a beam ID and/or a beam group ID, and to choose a RACH resource based on the beam and/or the beam group ID with the strongest RSRP. In such a case, eNB implicitly acquires at least coarse beam information (in case beam group ID is used for the UE's selecting the RACH resource) for the UE by detecting signals on the UE's RACH resource. The eNB can use the implicitly indicated coarse beam to transmit RAR for the UE. For data transmissions and/or receptions with higher spectral efficiency, fine beam association is likely to be necessary. For this beam configuration, the UE needs to report RSRPs of selected MRS-1 resources (Step 6); and then the UE can be configured with a (fine) beam index.

Figure 9:
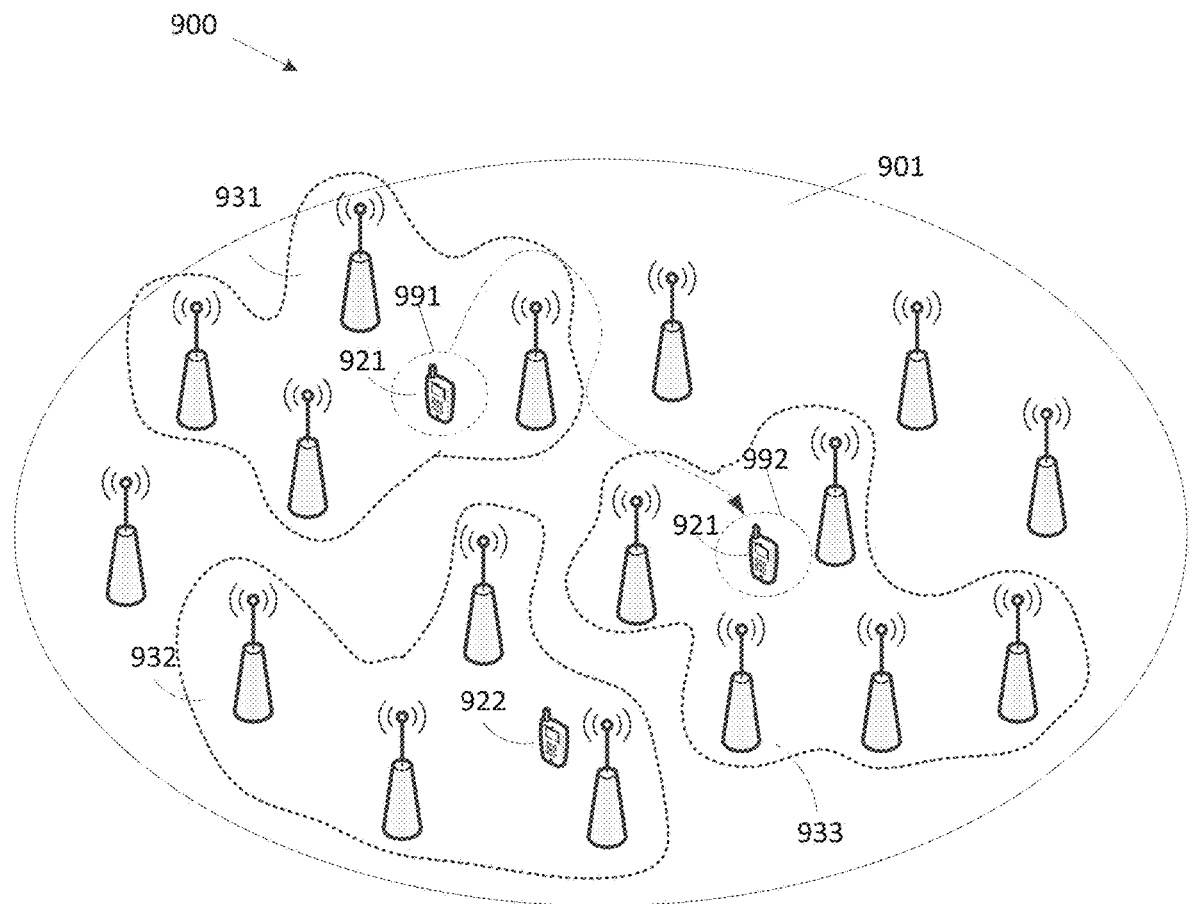
FIG. 9 illustrates an example network node communication in and around a coverage area of a serving cell according to embodiments of the present disclosure.

FIG. 9 illustrates an example network node communication 900 in and around a coverage area of a serving cell according to embodiments of the present disclosure. An embodiment of the network node communication 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As shown FIG. 9, a network nodes communication in and around a coverage area of a serving cell is performed according to some embodiments of the present disclosure. In a wireless system, a base station (BS) or an eNB could utilize one or more TRPs to cover the whole coverage area of one cell utilizing multiple coverage beams. Each TRP could construct one or more coverage beams, and one or more TRPs may construct a coverage beam together.

In some embodiments, a UE is configured to measure the RSRP of a subset of total coverage beams in a cell (denoted as a coverage beam group), wherein the coverage beams in the subset are transmitted from a subset of the TRPs in one cell. The subset of the TRPs could include one TRP, multiple TRPs or all the TRPs. The configuration could be UE-specific or cell specific. The subset of TRPs (and also coverage beams) configured to be measured by a UE could be changed for example after UE moving to another location within one cell or to another cell.

In the present disclosure, "TRP subset" may imply "(coverage) beam group," when they are used for configuring a subset of beams.

An example is illustrated in FIG. 9, in which $N_{TRP}(\geq 1)$ TRPs are utilized to cover the coverage area of one cell 901. Each TRP utilizes one or more coverage beams. A UE 921 is configured to measure the coverage beams from TRP subset 931 and a UE 922 is configured to measure the TRP subset 932. The TRP subset 931 and 932 could have overlap or no overlap. The UE may be configured to update a TRP subset to measure RSRP (via RRC signaling). As shown in FIG. 9, the UE 921 is configured to measure coverage beams from TRP subset 931 when the UE is positioned at location 991. After the UE 921 moves to location 992, the UE is configured to measure the coverage beams from TRP subset 933.

In one embodiment, a UE is configured with one or more of coverage beams transmitted from one or more TRPs, e.g., for UL/DL data and control reception. The BS uses the associated coverage beam(s) to transmit DL signals to a UE; and the UE utilizes a corresponding Rx beam to the configured coverage beams for the DL signal reception.

Figure 10A:
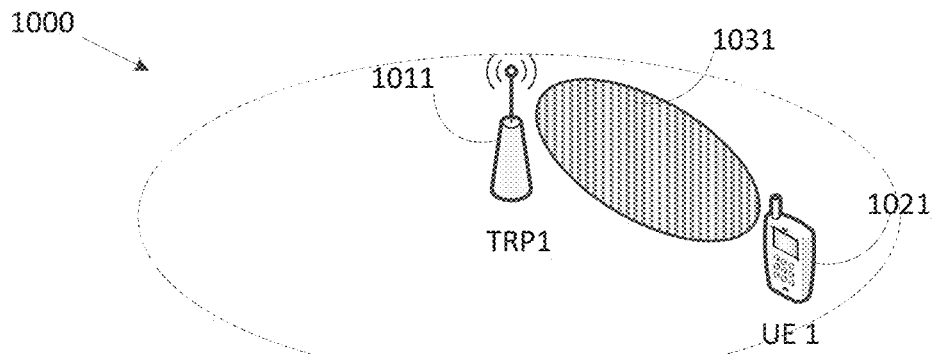
FIG. 10A illustrates an example a single beam from a single transmission/reception point (TRP) according to embodiments of the present disclosure.

FIG. 10A illustrates an example a single beam from a single transmission/reception point (TRP) 1000 according to embodiments of the present disclosure. An embodiment of the single beam from a single TRP 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions. Other embodiments are used without departing from the scope of the present disclosure.

Depending on the network topology, a UE can be associated with: (1) a single beam from a single TRP as illustrated in FIG. 10A; and (2) N beams from N TRPs as illustrated in FIG. 10B.

Figure 10B:
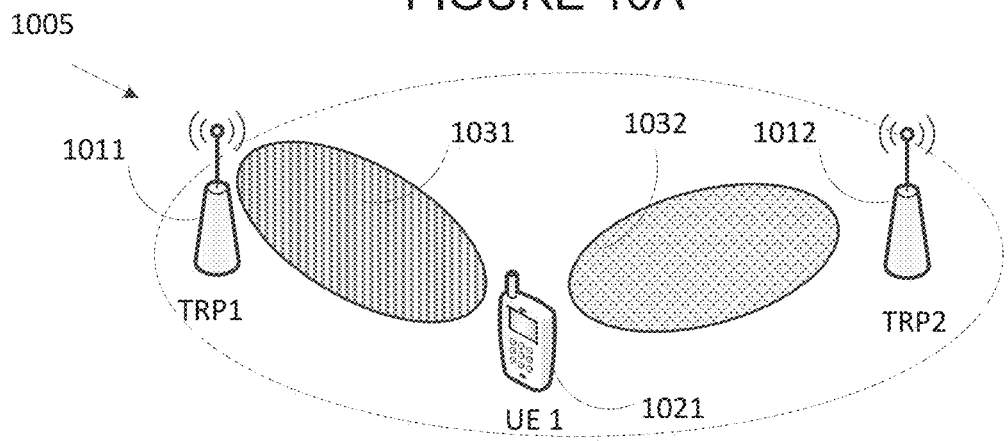
FIG. 10B illustrates an example two coverage beams according to embodiments of the present disclosure.

FIG. 10B illustrates an example two coverage beams 1005 according to embodiments of the present disclosure. An embodiment of the two coverage beams 1005 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions. Other embodiments are used without departing from the scope of the present disclosure.

In one example shown in FIG. 10A, the UE1 1021 is configured with one beam 1031 transmitted from TRP1 1011, for UL/DL data and control reception. The BS may also configures the UE1 1021 to measure the RSRP of coverage beams transmitted from TRP1 1011.

In the example shown in FIG. 10B, the UE1 1021 is configured with two coverage beam beams, one beam 1031 from TRP1 1011 and the other beam 1032 from TRP2 1012. Both beams 1031 and 1032 provide strong signal strength to the UE1 1021. To achieve this, the UE1 1021 is configured to apply a constrained beam RSRP measurement of TRP1 1011 and TRP2 1012.

Figure 10C:
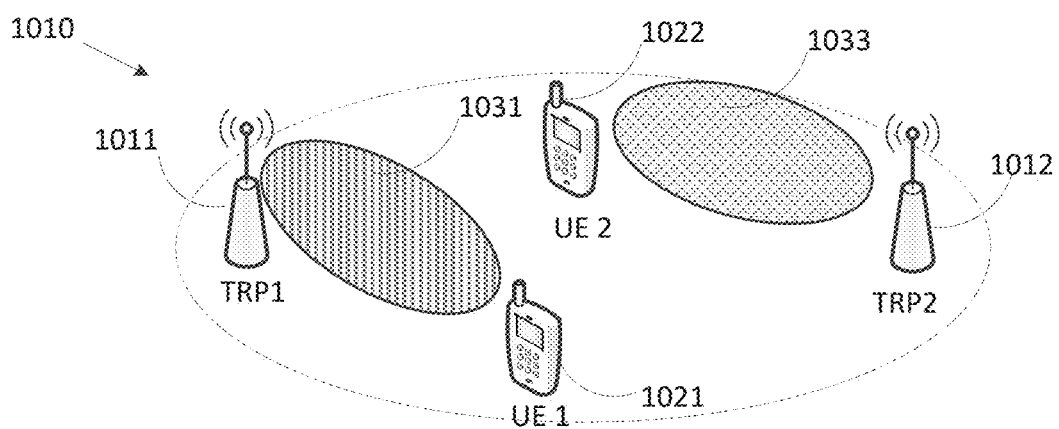
FIG. 10C illustrates another example two coverage beams according to embodiments of the present disclosure.

FIG. 10C illustrates another example two coverage beams 1010 according to embodiments of the present disclosure. An embodiment of the two coverage beams 1010 shown in FIG. 10C is for illustration only. One or more of the components illustrated in FIG. 10C can be implemented in specialized circuitry configured to perform the noted functions or one or more of the components can be implemented by one or more processors executing instructions to perform the noted functions. Other embodiments are used without departing from the scope of the present disclosure.

In the example shown in FIG. 10C, a UE is configured to be associated with coverages beams from two TRPs. The UE1 1021 is associated with coverage beam 1031 from TRP1 1011 and the coverage beam 333 from TRP 2 1012. The coverage beam 1031 (e.g., single beam) provides strong signal strength to the UE1 1021 while the coverage beam 1033 from TRP2 1012 causes weak signal strength to the UE1 1021. In this way, the BS could use beam 1031 to transmit signal to the UE1 1021 and simultaneously, the BS could use beam 1033 from TRP2 1012 to serve another UE (e.g., UE2 1022) without causing much interference to UE1 1021.

In some embodiments, a UE measures and reports the received beams' reference signal received power (RSRP), taking into account beam grouping. The beam grouping may or may not affect UE's behavior on RSRP measurement, but it does change UE behavior on selecting RSRP reporting contents.

For RSRP measurement, the UE is configured to measure RSRP of $N_{total}$ (Tx) beams for each Rx beam for a serving cell, via performing measurements on MRS-1. For this purpose, MRS-1 is transmitted on $N_{total}$ orthogonal resources in a period, each corresponding to a Tx beam. An MRS-1 resource may correspond to a combination of at least one of a comb index, an OCC code index, a subframe index, an OFDM symbol index, a subband index and an antenna port number. If the UE has $N_{Rx}$ beams, the UE will measure $N_{Rx} \cdot N_{total}$ RSRPs for all the combinations of a Tx and a Rx beam. The $N_{total}$ beams are constructed by the eNB such that the UE in a coverage area of a cell 201 may be able to receive at least one of those beams. The $N_{total}$ beams may be partitioned into a number of beam groups, wherein the beams in the groups are constructed by TRPs in a TRP subsets 931, 932, 933 as shown in FIG. 9. The beam grouping information can be configured in the higher layer, e.g., MIB (step 3 in FIG. 8) or SIB (step 4 in FIG. 8), or in an RRC configuration (after Step 5, e.g., in RAR or in a separate RRC signaling).

At least two methods can be considered on how to design the beam grouping information signaling and how to index those $N_{total}$ beams.

In one embodiment of the first method, $N_{total}$ beams are indexed by a single beam index (BI) $b \in \{0,1,\ldots,N_{total}-1\}$. The beam grouping information includes at least: number of beam groups, $N_g \in \{0,1,\ldots,N_{g,max}-1\}$, wherein the beam groups are indexed by $n \in \{0,1,\ldots,N_g-1\}$.

When the beam groups have the same number of beams, each beam group has $N_B$ ($=N_{total}/N_g$) beams; in this case beam n has $N_{B,n}$ beams, and $N_{B,n}=N_B$, for all n. For example, when $N_{total}=100$, and $N_g=5$ is configured, each group has $N_B=20$ beams, and group n has BIs comprising $\{N_B(n-1), N_B n-1\}$ or equivalently $N_B(n-1)+b'$, wherein $n \in \{0,1,\ldots,N_g-1\}$ and $b' \in \{0,1,\ldots,N_B\}$.

In a more general alternative, the beam grouping information comprises a list of $N_g$ numbers of beams of the beam groups with potentially different numbers of beams in different beam groups: $\{N_{B,n}\}$, wherein $$\sum_{n=0}^{N_g-1} N_{B,n} = N_{total}.$$

In one embodiment of the second method, $N_{total}$ beams are indexed by two indices: a beam index (BI) $b \in \{0,1,\ldots,N_B-1\}$ and a beam group index $n \in \{0,1,\ldots,N_g-1\}$, wherein $N_{total}=N_B \cdot N_g$ and $N_B$ is a constant. The beam grouping information includes at least the following: number of beam groups, $N_g \in \{0,1,\ldots,N_{g,max}-1\}$, wherein the beam groups are indexed by $n \in \{0,1,\ldots,N_g-1\}$.

In one embodiment of the third method, $N_{total}$ beams are indexed by a single beam index (BI) $b \in \{0,1,\ldots,N_{total}-1\}$, and an additional index (scrambling ID, SCID) is configured to indicate a scrambling sequence for constructing those beam MRS-1. Multiple MRS-1 with a same beam ID but with different scrambling IDs are mapped on a same MRS-1 resource, but the different scrambling IDs have different scrambling sequences; the different scrambling IDs are multiplexed in a non-orthogonal manner in the same MRS-1 resource. In such embodiment, the UE is configured with "MRS scrambling ID (SCID) information," which indicates the SCIDs used for MRS-1 construction. When the UE is configured with $N_{sc}$ scrambling IDs, the UE needs to measure RSRPs for $N_{sc} \cdot N_{total}$ Tx beams per Rx beam.

In such embodiment, the frequency resources within a cell for MRS-1 transmissions is allowed to reuse, and is useful for a cell with multiple group of TPs covering different geographical areas as illustrated in FIG. 9. For example, when the UE is configured with two SCIDs (i.e., $N_{sc}$=2), the UE can estimate RSRPs from two different TRP groups. An eNB may be able to utilize the RSRP measurement on the two TRP groups for inter-TRP-group beamforming operations.

In some embodiments, the UE is configured to assume for beam RSRP measurement that: (1) the beams constructed with a first SCID belongs to a first beam group; and (2) the beams constructed with a second SCID belongs to a second beam group. In such embodiments, the UE assumes that $N_g = N_{sc}$, and $N_B = N_{total}$. The UE is configured to measure $N_{sc} \cdot N_{total}$ RSRPs per Rx beam, with applying these $N_{sc}$ different scrambling initializations generated by those $N_{sc}$ scrambling IDs (and also correspondingly different scrambling sequence). In one example, the scrambling sequence is initialized in a form of (physical cell ID)*$2^A$+SCID, wherein A is a positive integer. The "MRS SCID information" can be configured in MIB (Step 3 in FIG. 8), SIB (Step 4 in FIG. 8) or in an RRC configuration (after Step 5, e.g., in RAR or in a separate RRC signaling).

In one example, the "MRS SCID information" directly indicate a list of SCIDs: {a first SCID, a second SCID, . . . , a $N_{sc}$-th SCID}. In another example, the "MRS SCID information" indicate a list of SCIDs out of a few candidates: choice of {a first SCID}, {a first SCID, a second SCID}, {a first SCID, a second SCID, a third SCID, a fourth SCID}. In yet another method, "MRS SCID information" indicate a number of SCIDs: choice of 1, 2 or 4. When the UE is configured with a value out of 1, 2 and 4, the indicated candidate SCIDs are {a first SCID}, {a first SCID, a second SCID}, and {a first SCID, a second SCID, a third SCID, a fourth SCID}, respectively.

Figure 11A:
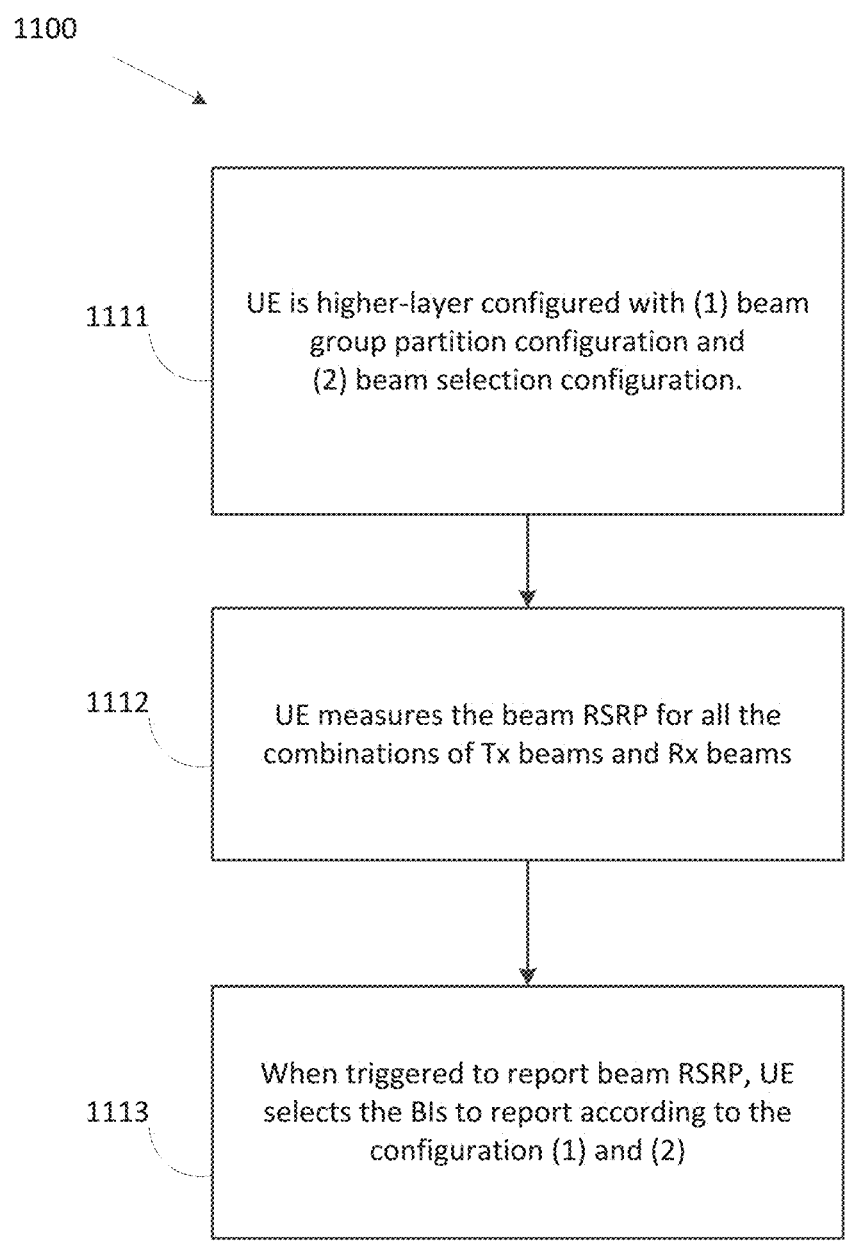
FIG. 11A illustrates a flow chart of a method to receive control signal, and measure and report BIs and beam RSRPs according to embodiments of the present disclosure.

FIG. 11A illustrates a flow chart of a method 1100 to receive control signal, and measure and report BIs and beam RSRPs according to embodiments of the present disclosure, as may be performed by a user equipment (UE). An embodiment of the method 1100 shown in FIG. 11A is for illustration only. One or more of the components illustrated in FIG. 11A can be implemented in specialized circuitry configured to perform the noted functions or one or more of the components can be implemented by one or more processors executing instructions to perform the noted functions. Other embodiments are used without departing from the scope of the present disclosure.

As shown in FIG. 11A, at step 1111, the UE is configured in the higher-layer (RRC) with: (1) a beam grouping information ($N_g$ beam groups, wherein beam group n is with $N_{B,n}$ beams); and (2) a beam selection method for a RSRP report (on PUSCH or PUCCH). At step 1112, with the received MRS-1, the UE measures the RSRP of (Tx) beams per Rx beam; if the UE has $N_{Rx}$ beams, the total number of beam RSRPs become $N_{Rx} \cdot N_{total}$ (or alternatively $N_{Rx} \cdot N_{total} \cdot N_{sc}$ for method 3) for all the combinations of a Tx and a Rx beam. At step 1113, when the UE is triggered to report RSRP, the UE reports the RSRP of the selected beam and BI of the beam at least partly according to the configurations (1) and (2) as shown above.

In some embodiments, the RSRP is periodically reported on a PUCCH. The UE is higher-layer (RRC) configured with a subframe period and an offset, and the PUCCH resource for PUCCH RSRP reporting. On a subframe configured for PUCCH RSRP reporting, the UE selects the beam with highest RSRP of all the beams across all the beam groups, and reports (a beam group ID, a beam ID, the corresponding RSRP) on the PUCCH resource.

In some embodiments, the RSRP reporting is triggered by a UL grant DCI. The UE may also be higher-layer (RRC) configured or dynamically indicated on the UL grant DCI a number ($N_r$) of beams per beam group to be included in a PUSCH report; alternatively $N_r$ is a constant positive integer, e.g., 2, 4. The UL grant DCI includes a bit field to indicate whether and how UE needs to report the RSRP. When the state of the bit field is a first state, the UE is configured to transmit data only (no RSRP reports) on the scheduled PUSCH. When the state of the bit field is the other states, beam RSRP is reported on the scheduled PUSCH.

In some embodiments, a UE is configured to report $N_r N_g$ RSRPs and $N_r N_g$ BIs on the scheduled PUSCH. The UE is configured to measure RSRP of the beams in each of $N_g$ beam groups. Then, the UE selects the largest $N_r$ RSRPs per beam group and corresponding BIs for the report. A method (beam selection configuration (2) at step 1111) is configured in the higher layer, to indicate the UE how to select the $N_r$ largest-RSRP beams per beam group for the report. In one example, when a first method is configured (e.g., independent measurement), the $N_r$ largest-RSRP beams of one beam group are selected independently of those beams selected for another beam group. This embodiment is useful when eNB utilizes DL transmission techniques involving a single TRP or DPS for DL data transmissions for a UE. The UE is configured to report $N_r$ pairs of (a beam ID, the corresponding RSRP) per configured beam group (in this case the UE reports $N_r N_g$ pairs of information), wherein the beam IDs in each group are selected such that the corresponding RSRPs are among the $N_r$ best beams in the beam group.

In another example, when a second method is configured (e.g., Rx-beam constrained measurement), the i-th largest-RSRP beam of one beam group is selected according to a constraint that the same Rx beams are used for the i-th largest-RSRP beam of another beam group, wherein E {1, 2, . . . , $N_r$}. This method is useful when eNB utilizes non-coherent JT or other related CoMP techniques involving multiple TRPs for DL data transmissions. In such example, for selecting the 1s$^t$ largest-RSRP beams, the UE first select a first BI with the largest RSRP among all the beams across all the groups. Then the UE selects a second BI that has the best RSRP among the beams in each of other beam groups than a first beam group which the first BI belongs to, under the constraint that a same Rx beam as used for deriving the best RSRP of the first beam group is used for the beams in each of other beam groups. The i-th largest RSRP beams can be selected similarly. In such example, there exists a few alternatives for constructing reporting contents of the Rx-beam constrained measurement and they are discussed in details in the followings.

In one example of alternative 1 for the second method (Rx-beam constrained measurement), a UE is configured to report $N_r$ beam RSRP reports on the scheduled PUSCH, wherein for each beam RSRP report the UE is configured to include $N_g$ beam IDs; one BI per beam group.

For constructing these reports, the UE is configured to calculate sum RSRPs of $N_g$ beams, one beam per beam group, for each Rx beam. In this case, the total number of sum RSRPs will be $N_B^{N_g} \cdot N_{Rx}$. The UE is configured to order the sum RSRPs in a descending order. The beams comprising i-th beam RSRP report achieves the i-th largest sum RSRP according to a constraint that a same UE Rx beam is used for all the beams in the report, wherein $i \in \{1, 2, \ldots, N_r\}$.

In one embodiment, each beam RSRP report comprises: {a first beam ID, a second beam ID, ..., a $N_g$-th beam ID, sum RSRP}, wherein the j-th beam ID is selected from the j-th configured beam group, $j \in \{1,2, \ldots, N_g\}$; and the sum RSRP is the sum of the RSRPs corresponding to the reported beams.

In one embodiment, the beams comprising i-th report achieves i-th largest sum RSRP and also satisfies the condition that the RSRP of every beam is larger than a first beam RSRP threshold $\gamma_{b1}$ according to a constraint that the same UE Rx beams are used for all the beams. The value of beam RSRP threshold $\gamma_{b1}$ can be configured to the UE in the higher layer.

In one example of alternative 2, a UE is configured to select (1) the largest-RSRP beam from some of the configured beam groups (denoted as $N_{g,serving}$ serving beam groups) and (2) the least-RSRP beam from the rest of the configured beam groups (denoted as $N_{g,companion}$ companion beam groups) for the RSRP reporting on the scheduled PUSCH. Here, $N_g = N_{g,serving} + N_{g,companion}$. For this purpose, the UE can be configured in the higher layer with an information element, which indicates which beam groups are serving group and which beam groups are companion groups. Alternatively, the UE can be configured in the higher layer with an information element, which indicates which beam groups are companion group; in this case the rest of the beam groups are serving groups.

For constructing these reports, the UE is configured to calculate (1) first-type sum RSRPs of $N_{g,serving}$ beams, one beam per serving beam group, for each Rx beam; and (1) second-type sum RSRPs of $N_{g,companion}$ beams, one beam per companion beam group, for each Rx beam. In this case, the total numbers of the first-type and the second-type sum RSRPs will respectively be $N_B^{N_{g,serving}} \cdot N_{Rx}$ and $N_B^{N_{g,companion}} \cdot N_{Rx}$. The UE is configured to order the first-type sum RSRPs in a descending order; and the second-type sum RSRPs in an ascending order. This UE implementation is illustrated in FIG. 11B.

Figure 11B:
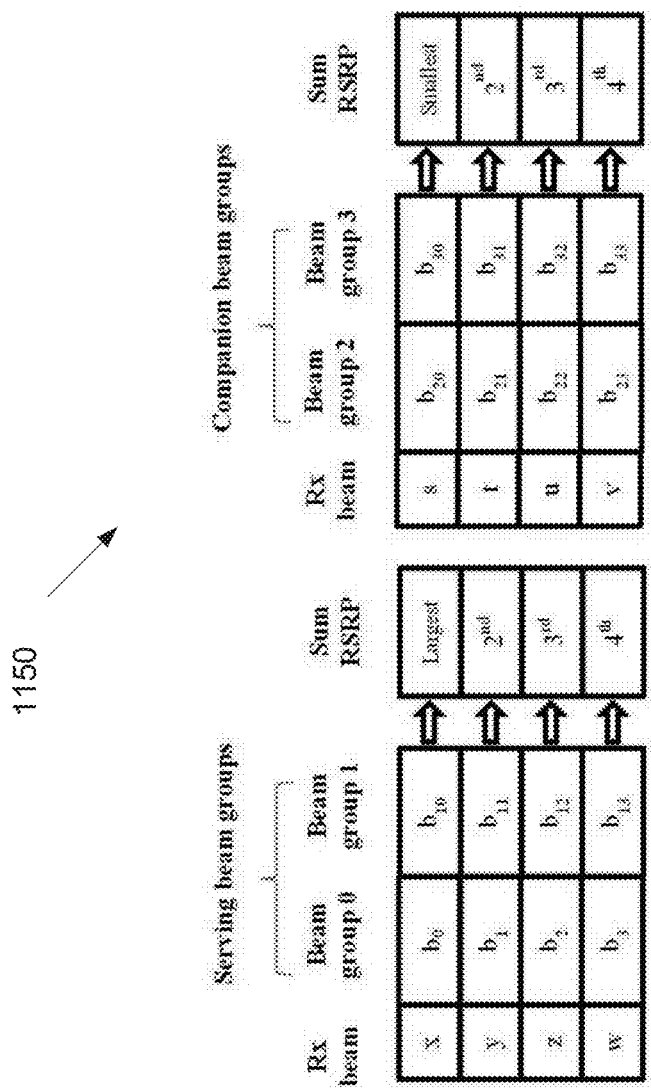
FIG. 11B illustrates an example serving and companion beam groups according to embodiments of the present disclosure.

FIG. 11B illustrates an example serving and companion beam groups 1150 according to embodiments of the present disclosure. An embodiment of the serving and companion beam groups 1150 shown in FIG. 11B is for illustration only. One or more of the components illustrated in FIG. 11B can be implemented in specialized circuitry configured to perform the noted functions or one or more of the components can be implemented by one or more processors executing instructions to perform the noted functions. Other embodiments are used without departing from the scope of the present disclosure.

The UE is configured with $N_{g,serving}=2$ serving beam groups, and $N_{g,companion}=2$ companion beam groups. The UE sorts the first and the second type sum RSRPs for serving and companion beam groups respectively with descending and ascending orders. The largest first-type sum RSRP is achieved with beams $b_0$, $b_{10}$ and Rx beam x; the second largest first-type sum RSRP is achieved with beams $b_1$, $b_{11}$ and Rx beam y; and so on. The smallest second-type sum RSRP is achieved with beams $b_{20}$, $b_{30}$ and Rx beam s; the second smallest second-type sum RSRP is achieved with beams $b_{21}$, $b_{31}$ and Rx beam t; and so on.

In one embodiment, the UE is configured to report $N_r$ beam RSRP reports on the scheduled PUSCH, wherein for each beam RSRP report the UE is configured to include $N_g$ beam IDs; one BI per beam group. The beams comprising i-th beam RSRP report are selected according to the following: the beams selected from the serving groups achieves the i-th largest sum RSRP (across all the combinations of Tx and Rx beam pairs), $i \in \{1,2, \ldots, N_r\}$; the beams selected from the companion groups satisfy the condition that the difference between the sum RSRP of beams selected from serving group and the sum RSRP of beams selected from companion beams is larger than an RSRP offset threshold $\gamma_{b2}$; and these beams are selected according to a constraint that the same UE Rx beams are used for all the beams, wherein $i \in \{1, 2, \ldots, N_r\}$.

The value of RSRP offset threshold $\gamma_{b2}$ could be configured to the UE in the higher layer with an information element. In one example, the beams comprising i-th beam RSRP report achieves the i-th largest sum RSRP of beams from serving group and also satisfies the condition that the sum RSRP of beams selected from serving group is larger than a first sum RSRP threshold $\gamma_{b3}$ and the sum RSRP of beams selected from the companion groups is smaller than a second sum RSRP threshold $\gamma_{b4}$, according to a constraint that the same UE Rx beams are used for all the beams, wherein $i \in \{1,2, \ldots, N_r\}$. The value of sum RSRP thresholds $\gamma_{b3}$ and $\gamma_{b4}$ could be configured to the UE in the higher layer with an information element.

In one example, each beam RSRP report comprises: {a first beam ID, a second beam ID, ..., a $N_g$-th beam ID, sum RSRP of serving groups}, wherein the j-th beam ID is selected from the j-th configured beam group, $j \in \{1, 2, \ldots, N_g\}$; and the sum RSRP of serving groups is the sum of the RSRPs corresponding to the reported beams in serving groups.

In one realization, the network configures the UE of the number of beam groups which can be used by the UE as serving group. A value of $N_s$, number of serving groups is configured to the UE through higher layer message. A UE is configured to report $N_r$ beam RSRP reports on the scheduled PUSCH, wherein for each beam RSRP report the UE is configured to include $N_g$ beam IDs; one BI per beam group. The beams comprising i-th beam RSRP report satisfies the condition that (1) the sum RSRP of beams selected from those $N_s$ beam groups is larger than a first sum RSRP threshold $\gamma_{b3}$ and (2) the sum RSRP of beams selected from other $N_g - N_s$ beams groups (which are selected as companion beam groups for this beam combinations) is smaller than a second sum RSRP threshold $\gamma_{b4}$, according to a constraint that the same UE Rx beams are used for all the beams, wherein $i \in \{1,2, \ldots, N_r\}$.

In one example, the beams comprising i-th beam RSRP report could achieve the i-th largest sum RSRP of beams selected from $N_s$ beam groups out of $N_g$ configured beam groups and also satisfies the condition that the offset between the sum RSRP of beams selected from those $N_s$ beam groups and the sum RSRP of beams selected from other $N_g - N_s$ beams groups is larger than an RSRP offset threshold $\gamma_{b2}$, according to a constraint that the same Rx beams are used for all the beams, wherein $i \in \{1,2, \ldots, N_r\}$.

In another example, each beam RSRP report comprises: {a first beam ID, a second beam ID, ..., a $N_g$-th beam ID, bitmap of beam group, sum RSRP of serving groups}, wherein the j-th beam ID is selected from the j-th configured beam group, $j \in \{1,2, \ldots, N_g\}$; and the bitmap of beam group is an $N_g$-bit field and bit #1 correspond to the first configured beam group, bit #2 corresponds to the second configured beam group and bit #$N_g$ corresponds to the $N_g$-th configured beam group. The value of one bit indicates if the corresponding beam group is used as serving group or companion group. The sum RSRP of serving groups is the sum of the RSRPs corresponding to the reported beams in serving groups.

In one embodiment, the UE is configured to report the receive beam capability to the BS. In one example, the UE uses one bit to indicate the BS whether the UE has only one receive beam or does beam sweeping over multiple receive beams. If the bit indicates that the UE does beam sweeping, the BS configures the UE to measure the RSRP by assuming same receive beam is used.

In one embodiment, a mapping is defined between RSRP index and the measured quantity value of RSRP. An example is shown in TABLE 1. A UE is configured to convert the measured RSRP quantity to the RSRP index and report the RSRP index in the RSRP reporting.

TABLE 1

An example of mapping

| RSRP index | Measured quantity value [dBm] |
|---|---|
| 0 | RSRP < −140 |
| 1 | −140 ≤ RSRP < −139 |
| 2 | −139 ≤ RSRP < −138 |
| ... | ... |
| 95 | −46 ≤ RSRP < −45 |
| 96 | −45 ≤ RSRP < −44 |
| 97 | −44 ≤ RSRP |

An embodiment of the present disclosure considers the transmit beam management for the transmission of PDCCH and PDSCH. The transmit beams used for PDCCH transmission and PDSCH transmission could be different. And thus a UE may be separately configured of: (1) the beams used for PDCCH transmissions; and (2) the beams used for a PDSCH transmission.

The transmission of PDCCH and PDSCH generally use different transmission schemes. For example, PDCCH could use some transmit diversity scheme, e.g., SFBC and PDSCH could use spatial multiplexing scheme or network MIMO scheme. The best beam corresponding to different transmission scheme could be different. In this manner, eNB may use different beams for PDCCH and PDSCH transmissions.

Figure 12:
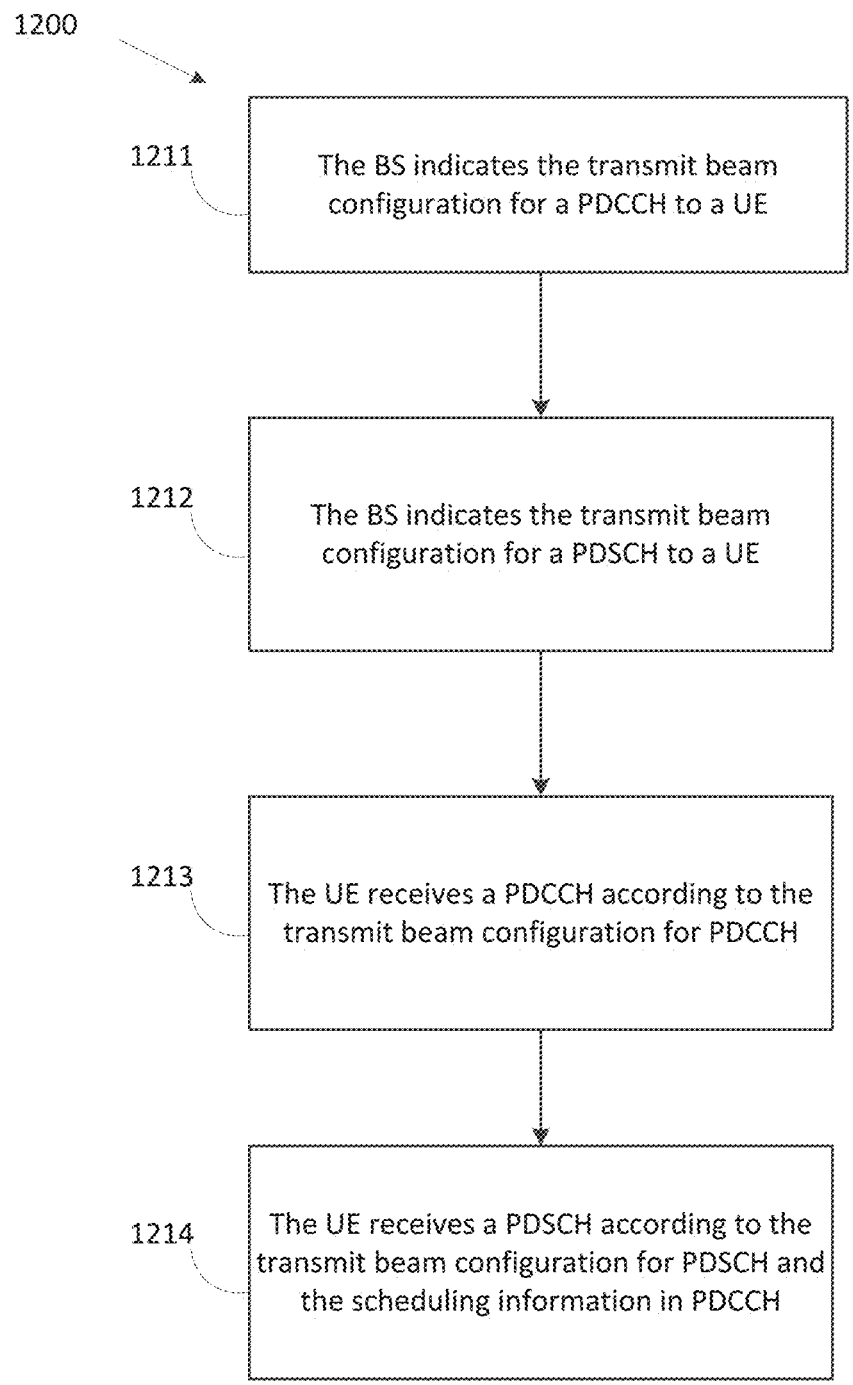
FIG. 12 illustrates a flow chart of a method for physical downlink control channel (PDCCH) decoding according to embodiments of the present disclosure.

FIG. 12 illustrates a flow chart of a method 1200 for physical downlink control channel (PDCCH) decoding according to embodiments of the present disclosure, as may be performed by a UE. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In one embodiment, the BS signals the transmit beam(s) used for a PDCCH transmission to a UE and the BS signals the transmit beam(s) used for a PDSCH transmission to a UE. The UE is configured to receive the PDCCH according to the transmit beam configuration from the BS and the UE decodes the PDCCH to obtain the scheduling information of PDSCH. Then the UE is configured to decode the PDSCH according to the transmit beam configuration for PDSCH and the scheduling information in PDCCH. An example is illustrated in FIG. 12. As shown in FIG. 12, in the procedure 1210, the BS first indicates the transmit beam configuration for a PDCCH to a UE in 1211. The BS indicates the transmit beam configuration for a PDSCH to the UE in 1212. The UE is configured to decode a PDCCH according to the transmit beam configuration for a PDCCH in 2113. And then the UE is configured to decode a PDSCH according to the transmit beam configuration for a PDSCH and scheduling information in a PDCCH in 1214.

The BS indicates the information transmit beam(s) used for PDCCH transmission to a UE through higher-layer signaling (e.g., RRC), MAC signaling or physical layer signaling (e.g., DCI in PDCCH). The information the BS signals to a UE to indicate the transmit beams used for PDCCH could be one of the followings: one beam index; multiple beam indices; one beam index and one beam group index}; multiple sets of {beam index, beam group index}; and the index of one item of beam information reporting.

In one method, the BS signals the information of transmit beam for PDCCH and a subframe timing information (k) to a UE. The UE is configured to receive the PDCCH with this configured transmit beam(s) starting from subframe n+k where the UE receive the configuration in subframe n.

The BS could indicate the information of transmit beams used for PDSCH transmission to a UE through higher-layer signaling (e.g., RRC), MAC signaling or physical layer signaling (e.g., DCI in PDCCH). The information the BS signals to a UE to indicate the transmit beams used for PDSCH could be one of the followings: one beam index; multiple beam indices; one beam index and one beam group index}; multiple sets of {beam index, beam group index}; and the index of one item of beam information reporting.

In one method, the BS signals the information of transmit beam for PDSCH and a subframe timing information (l) to a UE. The UE is configured to receive the PDSCH with this configured transmit beam(s) starting from subframe n+l where the UE receive the configuration in subframe n.

In one method, the BS configures the beam(s) for PDSCH transmission through a hybrid method. The information of a set of transmit beam(s) from which the BS will choose one beam for the transmission of a PDSCH is signaled through higher-layer signaling or MAC signaling. Then the BS may use a bit-field in PDCCH to indicate a UE the transmit beam used for a PDSCH. In one example, the BS configures 2 optional transmit beams to a UE, and the BS then use a 1-bit field in PDCCH to indicate the transmit beam used for a PDSCH transmission. In another example, the BS configures a set of 4 optional transmit beams to a UE, and the BS then use a 2-bit field to indicate the transmit beam used for a PDSCH transmission. In yet another example, the BS configures a set of 8 optional transmit beams to a UE, and the BS then use a 3-bit field to indicate the transmit beam used for a PDSCH transmission.

In one embodiment, the BS configures the transmit beam for a PDSCH through a DCI in PDCCH which schedules a PDSCH allocation. The DCI could contains explicitly the information of the transmit beam(s) used for a PDSCH allocation and the scheduling information for a PDSCH allocation. In one method, a UE-common DCI in one subframe could configure the transmit beam(s) used for all the PDSCH allocation in one subframe.

In one embodiment, the type information of one DCI configures the transmit beam(s) for a PDSCH. If the DCI type is one of some particular types, a PDSCH is configured to be transmitted with the same beam as PDCCH. If the DCI type is one of some particular types, a PDSCH is configured to be transmitted with the beams which could be explicitly indicated in the DCI or other signaling, using the methods described above.

The present disclosure considers indicating the receive beam to a UE for the downlink transmission of a PDCCH and a PDSCH. In this manner, the BS configures the receive beam that a UE may use in the reception of a PDCCH and a PDSCH, instead of indicating the transmit beam.

Figure 13:
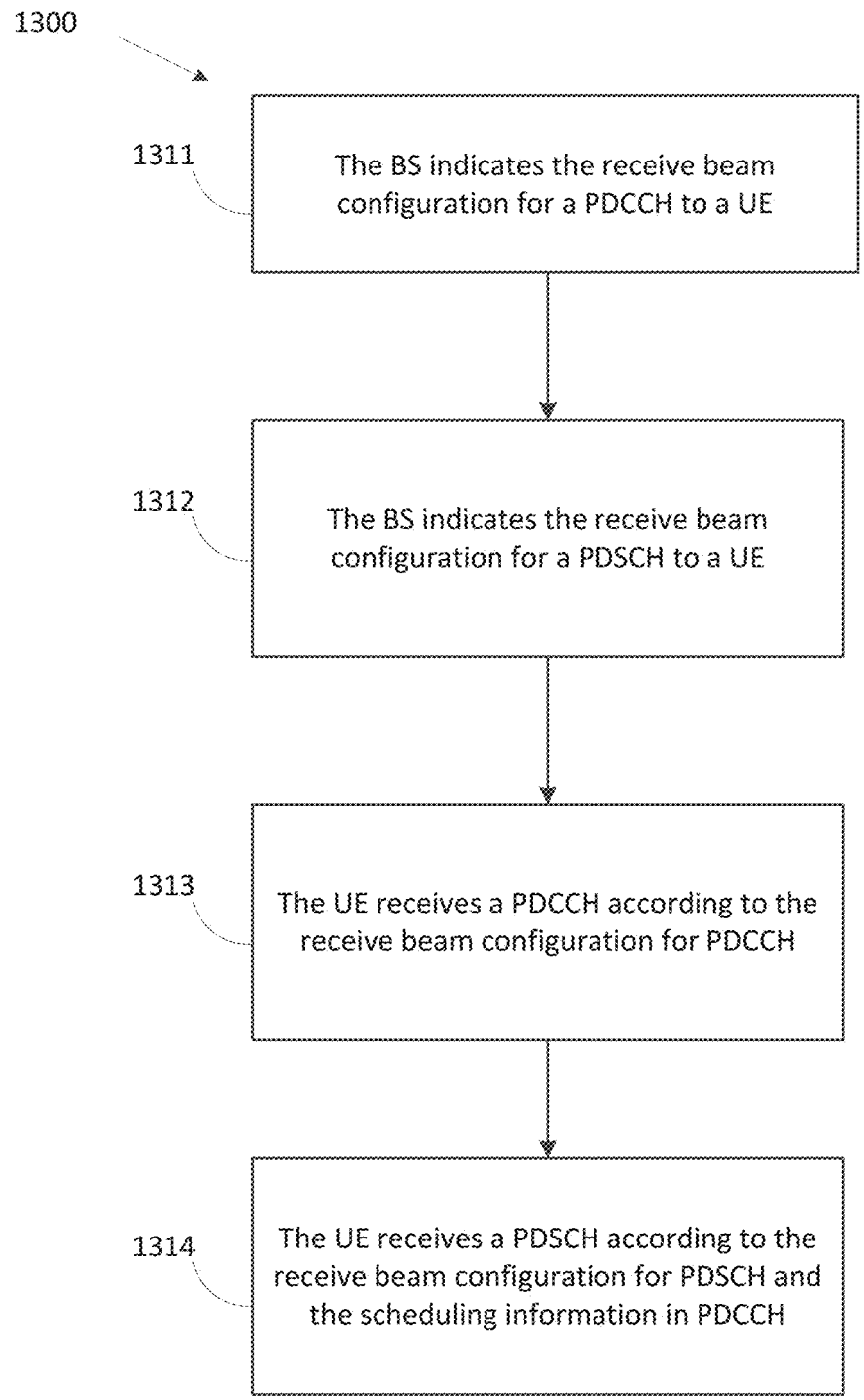
FIG. 13 illustrates a flow chart of a method for physical downlink shared channel (PDSCH) decoding according to embodiments of the present disclosure.

FIG. 13 illustrates a flow chart of a method 1300 for physical downlink shared channel (PDSCH) decoding according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

In one embodiment, the BS signals the receive beam used for a PDCCH transmission to a UE and the BS signals the receive beam used for a PDSCH transmission to a UE. The UE is configured to receive the PDCCH according to the receive beam configuration from the BS and the UE decodes the PDCCH to obtain the scheduling information of PDSCH. Then the UE is configured to decode the PDSCH according to the receive beam configuration for PDSCH and the scheduling information in PDCCH. An example is illustrated in FIG. 13. As shown in FIG. 13, in the procedure 1310, the BS first indicates the receive beam configuration for a PDCCH to a UE in 1311. The BS indicates the receive beam configuration for a PDSCH to the UE in 1312. The UE is configured to decode a PDCCH according to the receive beam configuration for a PDCCH in 1313. And then the UE is configured to decode a PDSCH according to the receive beam configuration for a PDSCH and scheduling information in a PDCCH in 1314.

The aforementioned embodiments for configuring transmit beam for PDCCH and PDSCH could be used here to configure the receive beam configuration for PDCCH and PDSCH by straightforward extension. The detailed descriptions for receive beam configuration are omitted here for brevity.

In some embodiments, beam measurement configuration is considered. A set of MRS antenna ports corresponds to a beam and a set of beam corresponds to one beam group. Such groups of beams and MRS configurations are referred to as beam group configuration.

In some embodiments, a UE obtains downlink and uplink synchronization and establishes RRC connection with an eNB. Assume the maximum number of BRSs can be configured is $N_{b,max}$ beams. The $N_{b,max}$ beams may be distinguishable in time, or frequency or both, e.g., by transmitting at different time instant or frequency domain. In one example, transmitting different beams at time instant is to transmit at different OFDM symbols. One example of transmitting different beams in frequency domain is to use different RE offsets for different beams. In another example, transmitting different beams in frequency domain is to use orthogonal covering code among different beams. In this disclosure, beam and beam reference signal (BRS) are used interchangeably.

In one example, in a beam group configuration, beams are partitioned into O groups, where group 0 contains beams $\{0 \ldots \text{floor}(N_{b,max}/O)\}$, group 1 contains $\{\text{floor}(N_{b,max}/O) \ldots 2\times\text{floor}(N_{b,max}/O)\}, \ldots$, and beam group O-1 contains $\{(O-1)\times\text{floor}(N_{b,max}/O) \ldots N_{b,max}\}$. Network needs to signal the value O of to UE. One method is explicit signaling through a few bits in DCI, RRC, MIB or SIB to indicate the number of beam groups. An example is given in TABLE 2. As illustrated in TABLE 2, the number of beams in a beam group is indicated by a state of a 2-bit field. The bit field may be included in a DCI or a RRC signaling message or an MIB/SIB.

TABLE 2

First example of beam group indication

| A state of a bit field | Number of beam groups |
|---|---|
| '00' | O = 1 |
| '01' | O = 2 |
| '10' | O = 4 |
| '11' | O = 8 |

In some embodiments, the number of beam groups is implicitly signaled. An eNB implicitly indicates a beam group which a BRS belongs to, by applying a beam group specific scrambling sequence. In an example, the BRSs are generated according to a pseudo-random sequence initialized by $C_{init}$, where $C_{init}=f(n_g)$+values not depending on group ID, and where $n_g$ is an group ID, $G_t=0 \ldots O_t-1$, $f(\cdot)$ is a predefined linear or non-linear function.

In one example, beams can be grouped as the following methods. O groups are mapped to beams as: beam group 0 contains beams $\{0:O:N_{b,max}\}, \ldots$, beam group O-1 contains beams $\{O-1:O:N_{b,max}\}$.

In some embodiments, the eNB may signal UE corresponding properties of O groups. One exemplary property is a beam selected from one beam group can be sent on the same OFDM symbol with another beam selected from a different beam group. In one example, denote the number of beam groups with this property as $O_t$. Another exemplary is that UE may assume that a beam selected from one beam group has different spatial correlation with a beam selected from a different beam group and a beam selected from the same group. In one example, denote the O of the number of beam groups with this property as $O_s$.

In one example, an eNB explicitly or implicitly configures beam group with a single property associated beam group. In an exemplary explicit configuration, the set number of beams in a beam group is indicated by a state of a bit field transmitted. The bit field indications may be transmitted via included in a DCI or a RRC signaling message or an MIB/SIB.

TABLE 3

Second example of beam group indication

| A state of a bit fields | Number of beam groups |
|---|---|
| '00' | $O_t = 1$ |
| '01' | $O_t = 2$ |
| '10' | $O_t = 4$ |
| '11' | $O_t = 8$ |

In one example of implicit configuration, an eNB implicitly configures indication of a beam group which a BRS belongs to, by applying a different beam group specific scrambling sequence for beams that are transmitted at different groups. In an example, the reference-signals in BRSs are generated according to a pseudo-random sequence initialized by $C_{init}$, where $C_{init}=f(G_t,n_g)$+values not depending on group ID, where $n_gG_t$ is an group ID, $G_t$=0 ... $O_t$-1, $f(\cdot)$ is a predefined linear or non-linear function.

In general, beams can be correlated in space. One example is that if two beams are formed towards two distinguished directions, they are not likely to be used at the same time. Another example is that if two beams are formed towards two close directions, they likely have similar BRSRP. By exploring such correlation, feedback overhead can be reduced. Dividing beams into one or more spatial groups serves as one way to explore such correlation. It also facilitates eNB and UE maintaining diverse beams that can be used to e.g. combat blockage, coordinated transmission, high rank transmission. One example is that in the presence of multi-path, two clusters may come from two different angles, each being captured by one beam group, and can be efficiently selecting within each group.

In some embodiments, $O_s$ is configured to indicate the grouping among beams. Multiple methods of mapping beams to groups are described. In a first alternative, $O_s$ groups are mapped to beams as: group 0 {0 ... floor $(N_{b,max}/O_s)$}, ..., group $O_s$-1 {$(O_s$-1)floor $(N_{b,max}/O_s)$+1 ... $N_{b,max}$}. In a second alternative, $O_s$ groups are mapped to beams as: group 0 {$0:O_s:N_{b,max}$}, ..., group $O_s$-1{$O_s$-1:$O_s$:$N_{b,max}$}. In one example, two adjacent beams may have very close spatial correlation. If the first alternative is used, the beams belong to a same group have less correlation. If the second alternative is used, the beams belong to a different group have less correlation.

In some embodiments, an eNB may configure beam groups with more than one property via signaling both $O_t$ and $O_s$. In a first alternative: A bit map is used to indicate both values at the same time. The indications may be transmitted via DCI or RRC signaling.

TABLE 4

Third example of beam group indications

| A state of a bit fields | Number of beam groups |
|---|---|
| '00' | $O_t$ = 1, $O_s$ = 1 |
| '01' | $O_t$ = 2, $O_s$ = 2 |
| '10' | $O_t$ = 4, $O_s$ = 2 |
| '11' | $O_t$ = 8, $O_s$ = 4 |

In one example, the mapping between $O_t$ and $O_s$ beam indices may be:

$$\text{group } 0 \left\{0:O_s:\text{floor}\left(\frac{N_{b,max}}{O_t}\right)\right\}, \text{group } 1 \left\{1:O_s:\text{floor}\left(\frac{N_{b,max}}{O_t}\right)\right\},$$

$$\ldots, \text{group } O_sO_t - 1 \left\{(O_t - 1)\text{floor}\left(\frac{N_{b,max}}{O_t}\right) + O_S:O_S:N_{b,max}\right\}.$$

In another example, an eNB implicitly configures indications of beam group by applying different scrambling sequence for beams that are transmitted at different groups. In an example, the reference-signals in BRSs are generated according to a pseudo-random sequence initialized by $C_{init}$, where $C_{init}=f(G_{t,s})$+values not depending on group ID, where $G_{t,s}$ is an group ID, $0 \leq G_{t,s} \leq O_tO_s-1$, $f(\cdot)$ is a predefined linear or non-linear function.

In some embodiments, an eNB may be equipped with a single TXRU connecting to an array, where the beams are formed e.g. via analog beamforming. In a second exemplary operation, an eNB may be equipped with K TXRUs, each connecting to an array. Two basic scenarios can be considered. The grouping parameter $O_t$ may be related to K, for example, $O_t$=K.

In some embodiments, each of the TXRUs may transmit a different set of beams, e.g., TXRU 0 transmits beam {0 ... floor $(N_{b,max}/O_t)$}, ..., TXRU $O_t$-1 transmits {$(O_t$-1)floor $(N_{b,max}/O_t)$+1 ... $N_{b,max}$}. In this case, the beams transmitted on different TXRUs may be used at the same time for data or control, while the beams transmitted on the same TXRUs may or may not be used at the same time for data or control (similar to the first example).

In some embodiments, all TXRUs transmit a same set of beams, e.g., beam {0 ... $N_{b,max}$-1}.

In some embodiments, flexible beam grouping is considered where one beam group configuration contains $N_G$ beam groups that are numbered $n_G$=1, ... $N_G$. In each beam group $n_G$, $N_B(n_G)$ beams are configured. And for one beam $n_B$ in beam group $n_G$, $N_p(n_B,n_G)$ antenna ports are configured. The transmission and configuration of beam beams by an eNB is dynamic and indicated by the eNB through DL control signaling in physical layer.

In some embodiments, higher-layer signaling is used to configure a UE with a set of beam groups, where a beam group configuration includes for example at least one of group index or group identification (ID), group properties, beam indices associated with the group or port indices associated with the beam. One example of a group configuration is shown in TABLE 5. Up to 8 beam groups can be indicated via 3 bits, where for a group, 3 properties can be associated with or without via 3 bits (e.g., "1" means the property is associated, "0" means not). The beam indices belonging to the group is indicated by 6 bits, choosing one out of 64 different beam combinations.

The port indices belonging to a beam or beam group are indicated by 4 bits.

TABLE 5

Example of beam group configuration

| Field name | Bits |
|---|---|
| Group ID | 3 bits |
| Group properties | 3 bits |
| Beam indices | 6 bits |
| Port indices | 4 bits |

A UE may be configured multiple beam groups, and an indication of groups can be dynamically indicated by a bit field in DCI, where an example in shown in TABLE 6.

TABLE 6

Example of indications of group configuration

| A state of a bit fields | Group configuration |
|---|---|
| '00' | A first group configuration |
| '01' | A second group configuration |
| '10' | A third group configuration |
| '11' | A fourth group configuration |

For beam and CSI reporting, it is beneficial for a UE to be aware of such beam transmission constraint, which are covered by the following embodiments. An eNB may configure UE to feedback a BSI report, or CSI report, or a joint BSI and CSI report. During the procedure of beam measurement, performing BSI report not depending on CSI consideration provides flexibility of CSI-RS transmission in the sequel, because the eNB may choose different beamforming weights to transmit CSI-RS other than the weights used to transmit BRS. On the other hand, in some circumstances, a joint feedback for BSI and CSI may enable UE to select BIs that are more suitable for data transmission later, as the BI selection procedure has accounted for the possible transmission schemes may be used. In some embodiment, an eNB configures a 1-bit to UE to indicate whether a BSI report is requested or a joint BSI/CSI report is requested via DCI or RRC signaling, as shown in TABLE 7.

TABLE 7

Example of feedback report configuration for BSI and joint BSI/CSI

| Bit fields | Feedback report |
|---|---|
| '0' | BSI report |
| '1' | Joint BSI and CSI report |

In one embodiment, one beam group configuration contains $N_G$ beam groups that are numbered $n_G=1, \ldots, N_G$. In each beam group $n_G$, $N_B(n_G)$ beams are configured. And for the $n_B$ th beam in beam group $n_G$, $N_p(n_B,n_G)$ antenna ports are configured. The transmission and configuration of at least one of beam, port and beam group is dynamic or semi-statically configured or indicated by the eNB through DL control signaling or higher-layer signaling.

A UE can be configured with either joint BSI and CSI reporting or separate BSI and CSI reporting, supporting various operation modes.

In some embodiments of the current disclosure, one UE is configured with some measurement mode for the measurement of multiple beam groups. In one example, there are two modes of measurement mode. One mode is constraint measurement mode and one mode is non-constraint measurement mode. The configuration of measurement mode can be signaled through a bit filed in DCI or RRC message. One example is bit=1 configs constraint measurement mode and bit=0 configs non-constraint measurement mode. Another example is the presence of one bit field to indicate the configuration of constraint measurement mode and the absence of one bit field indicates that non-constraint measurement mode is configured.

In one example, one UE is configured to do joint measurement over multiple beam groups if constraint measurement mode is configured. One realization is that UE may measure the sum BRSRP of transmit beam combination by selecting one beam from every beam group and one receive beam, and then UE reports the beam combination with the strongest sum BRSRP to eNB.

In one example, one UE is configured to do non-joint measurement over multiple beams groups if non-constraint measurement mode is configured. One realization is that UE may measure the BRSRP of every beams and every receive beam, and then UE reports the beams with strongest BRSRP of each beam group.

In some embodiments, a UE selects a subset of preferred BIs as well as calculating CSI report jointly. In one example, the joint CSI report includes at least one of CQI, PMI, RI, BI and BRSRP, where CQI and PMI can be either subband or wideband, and RI, BI and BRSRP is wideband, as shown in TABLE 8.

TABLE 8

Example of joint CSI and BSI report

| CSI report | Wideband | Subband |
|---|---|---|
| CQI | x | x |
| PMI | x | x |
| RI | x | |
| BI | x | |
| BRSRP | x | |

Figure 14:
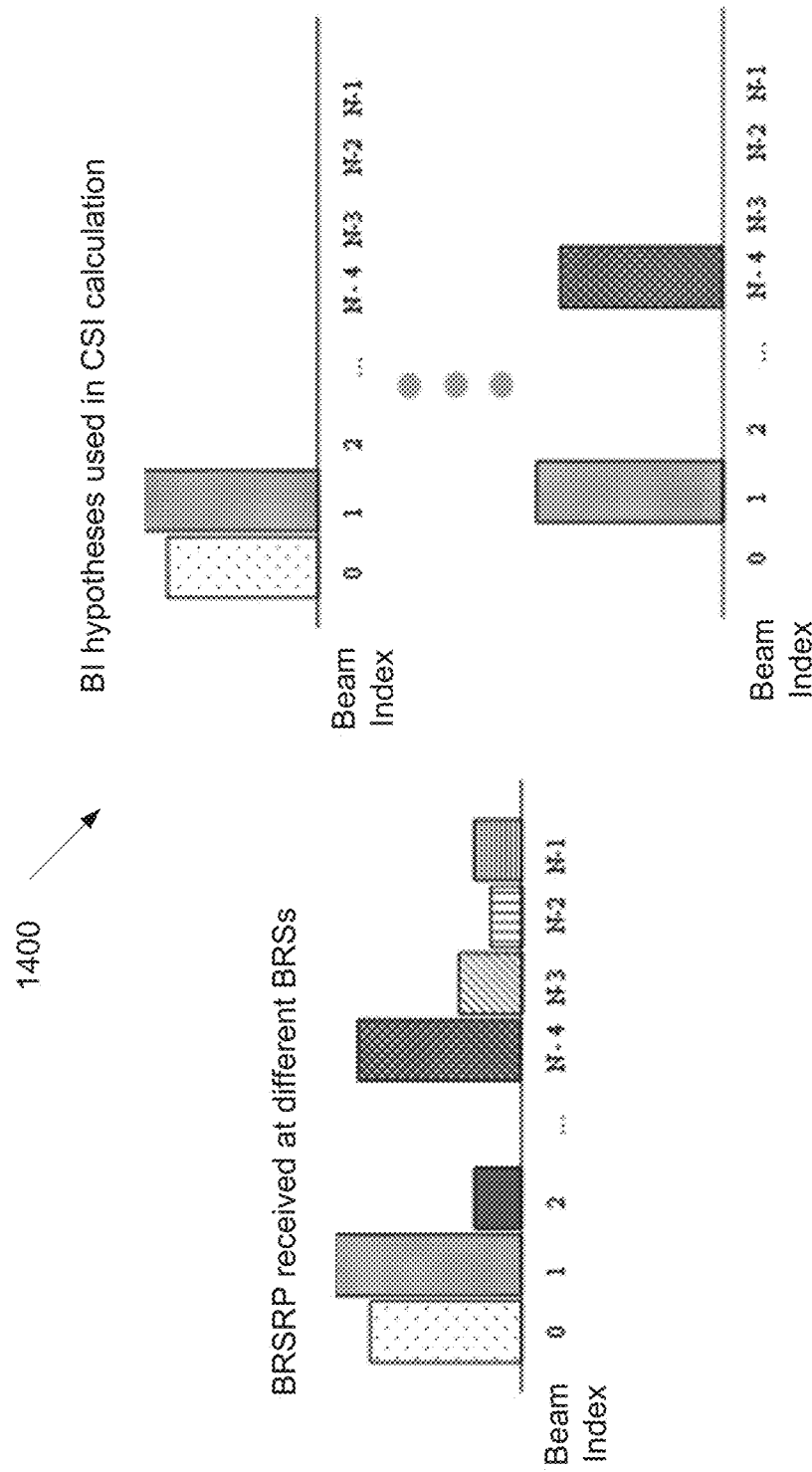
FIG. 14 illustrates an example joint beam state information (BSI) and channel state information (CSI) reporting according to embodiments of the present disclosure.

FIG. 14 illustrates an example joint beam state information (BSI) and channel state information (CSI) reporting 1400 according to embodiments of the present disclosure. An embodiment of the joint BSI and CSI reporting 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

The UE calculates CQI, PMI and RI conditioned on a possible combination of BIs, as illustrated in FIG. 14.

In some embodiments, the UE is configured with up to rank v transmission. The UE can select up to v beams in a hypothesis in CSI calculation, where each of the beams correspond to a BRS port, namely $\{p_{brs}+\text{biSelected}(0), \ldots, p_{brs}+\text{biSelected}(v-1)\}$. Here biSelected includes integer indices so that $p_{brs}+\text{biSelected}(i)$ corresponds to the BRS port of the selected beam i. For notation simplicity, denote $\{p_{brs}+\text{biSelected}(0), \ldots, p_{brs}+\text{biSelected}(v-1)\}$ as $\{p_{brs,0}, \ldots, p_{brs,v-1}\}$.

In some embodiments, CQI is defined as follows: based on an unrestricted observation interval in time and frequency, the UE may derive for each CQI value reported in uplink subframe n the highest CQI index which satisfies the following condition, or CQI index 0 if CQI index 1 does not satisfy the condition: a single PDSCH transport block with a combination of beam index selection, modulation scheme and transport block size corresponding to the CQI index, and occupying a group of downlink physical resource blocks termed the CSI reference resource, could be received with a transport block error probability not exceeding 0.1.

In some embodiments, if the UE is configured for PMI/RI reporting, the UE assumes overhead is consistent with the most recent reported rank; and PDSCH signals on antenna ports $\{p_{d,0}, \ldots, p_{d,v-1}\}$ for v layers would result in signals equivalent to corresponding symbols transmitted on antenna ports $\{p_{brs,0}, \ldots, p_{brs,v-1}\}$, as given by:

$$\begin{bmatrix} y^{p_{d,0}} \\ \ldots \\ \ldots \\ y^{p_{d,v-1}} \end{bmatrix} = W(i) \begin{bmatrix} x^{(0)}(i) \\ \ldots \\ \ldots \\ x^{(v-1)}(i) \end{bmatrix}$$

where $x(i)=[x^{(0)}(i) \ldots x^{(v-1)}(i)]$ is a vector of symbols from the layer mapping, $W(i)$ is the precoding matrix corresponding to the reported PMI applicable to $x(i)$.

In some embodiments, multiple alternatives of selecting BI hypothesis are described. In general, a valid combination of BIs satisfies: if v layer is assumed in the hypothesis testing, each port in $\{p_{brs,0}, \ldots, p_{brs,v-1}\}$ may from a different group that has a different $G_r$, where $0 \leq G_r \leq O_r-1$, and $0 \leq v \leq O_r-1$.

Figure 15:
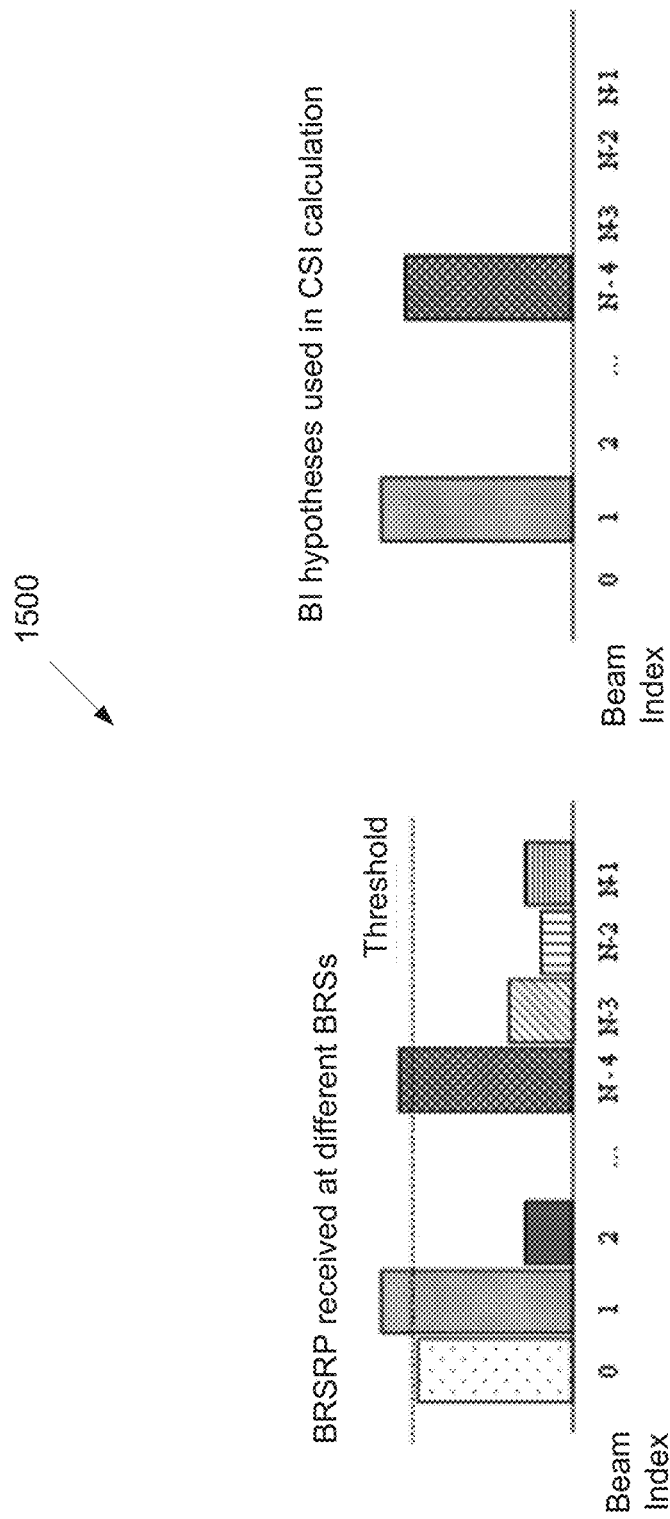
FIG. 15 illustrates an example beam index (BI) selection based on threshold according to embodiments of the present disclosure.

FIG. 15 illustrates an example beam index (BI) selection 1500 based on threshold according to embodiments of the present disclosure. An embodiment of the beam index (BI) selection 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In one example, all the valid combinations of beams/BIs/BRS, i.e., the number of BIs may be less or equal to the maximum rank configuration for the UE, are selected for BI hypotheses testing in CSI calculation. In another example, only BIs with BRSRP exceeds a threshold are considered in hypotheses testing, as shown in FIG. 15. Among these BIs, all the valid combinations of beams/BIs/BRS are selected for BI hypotheses testing in CSI calculation.

In some embodiments, multiple methods can be used to decide the threshold. In one example, a single and semi-static threshold is configured by eNB via higher layer signaling. In another example, a threshold is calculated by the UE based on the maximum BRSRP or average BRSRP of all BIs or BRSRP of some selected BIs. In one example, the threshold is set to be m % of the maximum BRSRP. In another example, the threshold is set to be m % of the average BRSP for the selected BIs.

Figure 16:
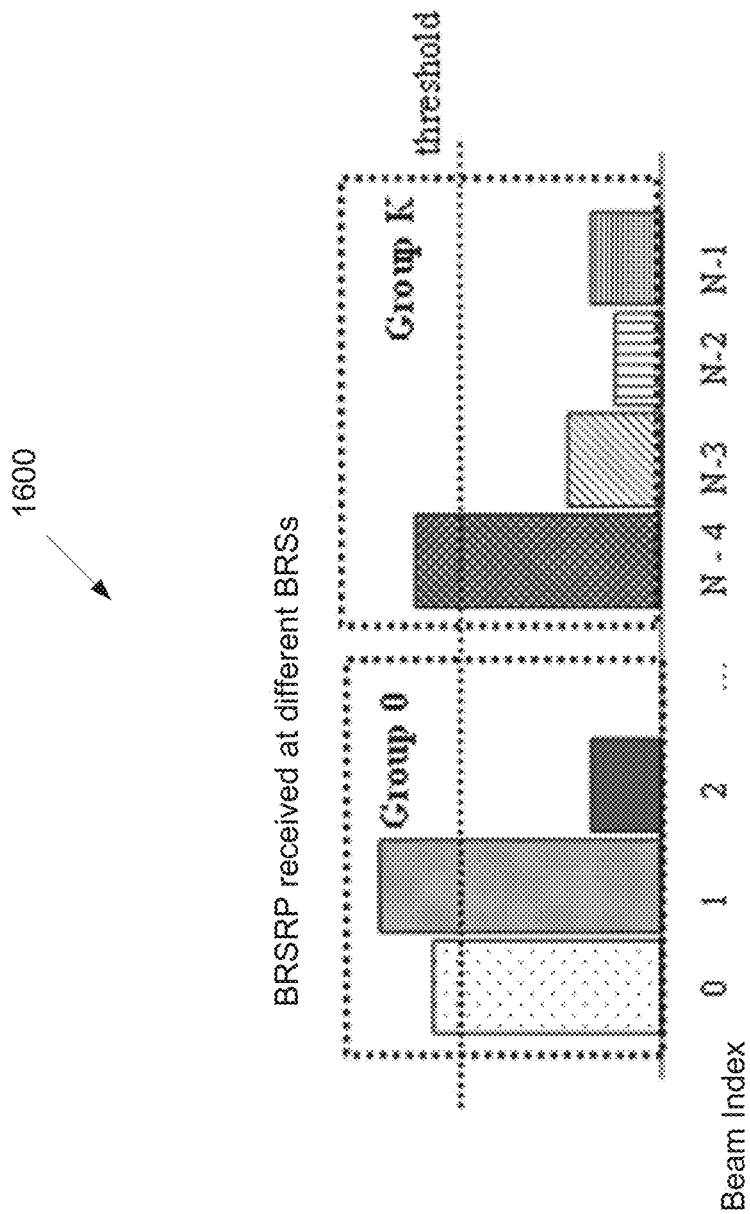
FIG. 16 illustrates an example of BI selection based on grouping and threshold according to embodiments of the present disclosure.

FIG. 16 illustrates an example BI selection 1600 based on grouping and threshold according to embodiments of the present disclosure. An embodiment of the BI selection 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

In some embodiments, both BI grouping and thresholding are applied. A set of beams (BIs) is divided into one or more groups. The UE first selects a subset of BIs, wherein: (1) for each group, the UE selects a best beam that has BRSRP exceeds a threshold; and (2) for each group, the UE selects the best Nbeams. Then, all valid combination of the selected BIs are used in CSI report hypotheses testing.

In some embodiments, if the UE is configured with separate BSI and CSI reporting, the UE selects a subset of preferred BIs and in the sequel calculates CSI report. In one example, the BSI includes BIs that have BRSRP exceeding a threshold and corresponding BRSRP value via PUSCH. In another example, the BSI and CSI report is calculated jointly using at least one embodiment described in the aforementioned embodiments, but only feedback BSI report. The eNB may transmit CSI-RS and trigger CSI report after receiving BSI report.

In some embodiments, feedback overhead reduction is described. After initial BSI report, eNB and UE may select a subset of beams whose beam directions are suitable for transmitting or receiving signal from each other. The selected subset of beams is unlikely to change rapidly over time. In addition, the BRSRP value may not deviate from each other very much; otherwise, the beam(s) of very small BRSRP comparing with other beams can be removed from the selected subset. These properties are considered and used by the following embodiments to reduce BSI feedback overhead.

In one example, an eNB configured a subset of beams for UE to track beams. The UE calculates its sequential BSI report on the selected subset of beams. The eNB to UE indication of the subset of beams can be sent via RRC signaling or higher layer signaling.

In another example, the UE tracks beams that may be suitable for transmitting/receiving and reports their offset with respect to the initial selected BIs. The offset can be either dynamically signaled by DCI or semi-statically configured by higher layer signaling.

In yet another example, a first beam's BRSRP value is reported using a full range, and if more than one beam is reported, the BSRSP values for other beams are calculated differentially with respect to the best beam. In one example, the first beam's BRSRP index and their corresponding value are given in TABLE 9 and TABLE 10.

TABLE 9

BRSRP index table for the first beam

| BRSRP index | Measured quantity value [dBm] |
|---|---|
| 0 | BRSRP <−140 |
| 1 | −140 ≤ BRSRP < −139 |
| 2 | −139 ≤ BRSRP < −138 |
| . . . | . . . |
| 95 | −46 ≤ BRSRP < −45 |
| 96 | −45 ≤ BRSRP < −44 |
| 97 | −44 ≤ BRSRP |

TABLE 10

BRSRP index table for the non-first beam

| BRSRP offset index | Measured quantity value offset [dBm] |
|---|---|
| 0 | offset <1 |
| 1 | 1 ≤ offset < 2 |
| 2 | 2 ≤ offset < 3 |
| 4 | 3 ≤ offset |

Figure 17A:
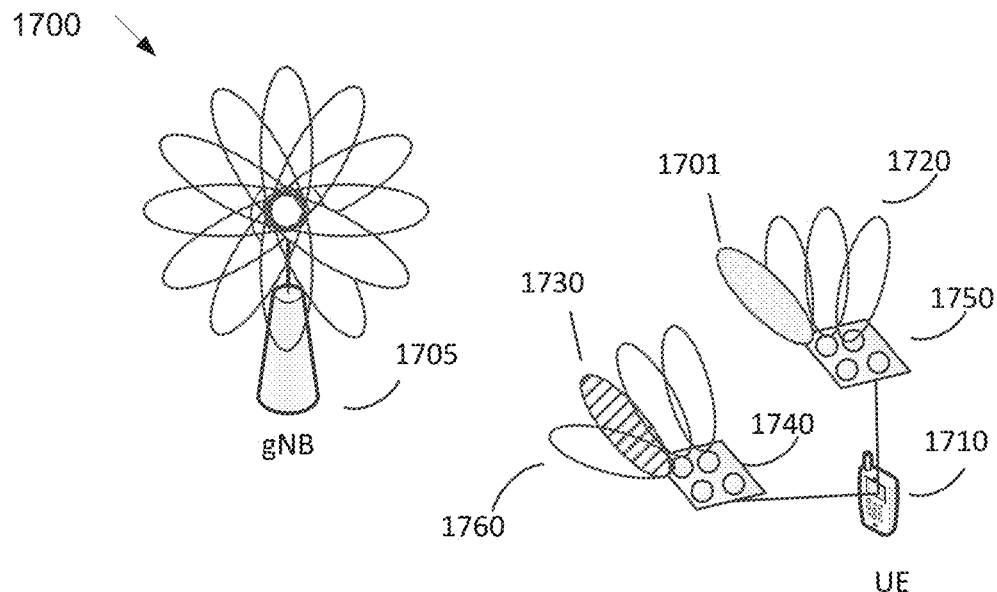
FIG. 17A illustrates an example reception (Rx) mode of a UE according to embodiments of the present disclosure.

In some embodiment, an "Rx mode" is defined as a set of UE receive analog beams. In other words, it is defined as UE reception operation using a set of UE receive analog beams (including the special case of one analog beam). The "Rx mode" can be called receive mode, Rx beam mode, Rx mode for beam management, an Rx beam, an Rx beam ID, receive pattern, receive beam pattern, Rx beam combination, Rx beam group, Rx beam set, Rx beam selection, Rx antenna port, spatial channel properties. The name "Rx mode" is exemplary and can be substituted with other names or labels without changing the substance of this embodiment FIG. 17A illustrates an example reception (Rx) mode 1700 of a UE according to embodiments of the present disclosure. An embodiment of the Rx mode 1700 shown in FIG. 17A is for illustration only. One or more of the components illustrated in FIG. 17A can be implemented in specialized circuitry configured to perform the noted functions or one or more of the components can be implemented by one or more processors executing instructions to perform the noted functions. Other embodiments are used without departing from the scope of the present disclosure.

The definition and mechanism of Rx mode is useful for UE Rx operation based on hybrid beamforming. The UE with hybrid beamforming can formulate one or more analog beams on each receive antenna panel and those beams can point to different directions. The gNB and the UE need to select one from those beams for the best link quality between the gNB and the UE. The transmission between the gNB and the UE, including for example, the downlink control channel PDCCH, the downlink data channel PDSCH is received by some UE's reception scheme with those selected beams. Changing the beam selection would change the UE reception and also the link quality. An example of Rx mode is illustrated in FIG. 17A. As shown in FIG. 17A, a UE 1710 communicates with a gNB 1705. The UE 1710 is equipped with two receive antenna panels 1750 and 1740, which could also be two antenna element arrays connecting to two different receive chains. On antenna panel 1750, the UE can formulate four analog beams 1720, pointing to different directions or with different beam widths. On antenna panel 17420, the UE can formulate four analog beams 1760, pointing to different directions or with different beam widths. The analog beams formulated on the same antenna panel cannot be used simultaneously. However, the UE can simultaneously use any two beams formulated on two antenna panels.

In the example of FIG. 17A, the UE would select one beam from 1720 and one beam from 1760 to receive the downlink transmission from gNB 1705. The UE can also only select one beam from 1720 or one beam from 1760 to receive the downlink transmission from gNB 1705. The selection of two beams, one beam from 1700 and one beam from 1760, can be called one Rx mode. In the example shown FIG. 17A, there can be totally up to 16 Rx modes in UE 1710, with selecting beams from both 1720 and 1760. The gNB 100 and the UE 1710 can do the beam measurement over all these 16 Rx modes. An Rx mode can also include the selection of only one beam from all panels, in which case there are in total 16+8=24 Rx modes. The UE can choose one Rx mode to receive the downlink transmission from gNB 1705. In the example, the UE 1710 chooses Rx mode with analog beams 1701 and 1730 to receive the signals from gNB 1705. The implementation of Rx mode can be up to UE's implementation. In the example of FIG. 17A, the UE implements one Rx mode with two beams selected from two antenna panels. For UE with one receive antenna panel, one Rx mode can be just one beam formulated in that antenna panel.

Figure 17B:
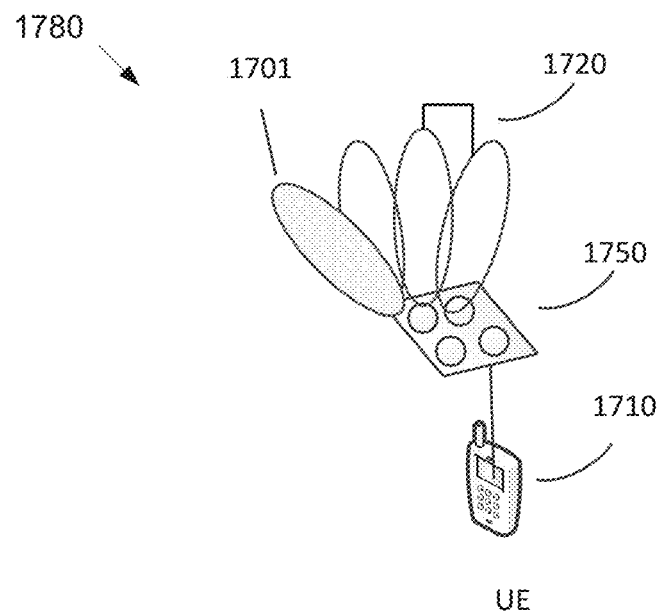
FIG. 17B illustrates another example reception (Rx) mode of a UE according to embodiments of the present disclosure.

FIG. 17B illustrates another example reception (Rx) mode 1780 of a UE according to embodiments of the present disclosure. An embodiment of the reception (Rx) mode 1780 shown in FIG. 17B is for illustration only. One or more of the components illustrated in FIG. 17B can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 17B, the UE 1710 is equipped with one antenna panel 1750, on which four analog beams 1720 with different directions can be formulated. An Rx mode corresponds to the selection of one beam. As shown in FIG. 17B, selection of analog beam 1701 is one Rx mode.

In a general example of UE with $N_{RX}$ antenna panels, one Rx mode of the UE can be implemented as the selection of one beam set: $\{\beta_{0,i_0}, B_{1,i_1}, \ldots, B_{N_{RX}-1}, i_{N_{RX}}-1\}$ where $B_{j,i_j}$ is one beam selected from j-th antenna panel or antenna array.

In some embodiment, the UE is configured to report the configuration or UE capability of Rx modes to the network. The UE signaling can be UE capability signaling/report. The configuration information of Rx mode can include at least one or more of the following. In one example, the configuration information includes a number of Rx modes. In such example, the configuration information can be the number of Rx modes that the UE wants to measure, or is capable to measure, through the beam management procedure and use one or more of them for receiving downlink transmission. In another example, the configuration information may be the ID of each Rx mode. In yet another example, the configuration information may be the information of spatial relationship between some Rx modes.

In such example, the UE can implement to use different Rx modes to cover different arrival directions. This is useful to mitigate the signal blockage around the UE. The information of different Rx modes covering different directions can be useful for the gNB, for example assisting the gNB to select the TRP Tx beam(s). In one example, the gNB can select one or more TRP Tx beam(s) that is (are) good to two UE Rx modes which cover different arrival directions.

In such example, such information can be the value of spatial correlation between two Rx modes. In one method, 1-bit information can be used as the indication of spatial correlation. For example, that 1-bit being 0 means two Rx modes pointing to different directions (or have weak spatial correlation) and that 1-bit being 1 means two Rx modes pointing to similar direction (or have strong spatial correlation).

In such example, such information can be the grouping of Rx modes. The UE can indicate that those Rx modes are divided into one or more groups. In one method, the Rx modes from different group point to different direction (or have weak spatial correlation) but the Rx modes in the same group point to similar direction (or have strong spatial correlation). In another method, the Rx modes in each group point to different directions (or have weak spatial correlation).

In such example, such information can be implicitly indicated through the ID of Rx modes. In one example, the ID of Rx modes is $\{1, 2, \ldots, N_{RM}\}$. The information of spatial correlation between Rx modes is indicated by the differential of two Rx mode ID|i-j|, where i and j are the IDs of two Rx mode. Larger value of |i-j| can indicate a lower spatial correlation between the arrival directions that two Rx mode point to. In such example (e.g., information on the priority of those Rx modes), the UE can indicate to the gNB which Rx mode(s) the UE prefers to use. Such information can assist the gNB to configure the beam measurement reference signal transmission and measurement. In one example, the gNB can configure the UE to measure and report the beam state information with respect to the Rx mode with high priority.

In some embodiment, the gNB can configure and reconfigure the Rx mode(s) to the UE. The purpose of the Rx mode(s) configuration can be for measurement and/or for receiving downlink control/data transmissions. In one example, the gNB can indicate the UE to change the number of Rx modes. In another example, the gNB can indicate to the UE not to use one or more Rx modes. In another example, the gNB can indicate the UE to change the priority of the Rx modes.

In some embodiment, the UE can indicate the gNB that the configuration of Rx modes has been updated and the UE reports the updates to the gNB. The configuration of Rx modes can be signaled in high layer signaling (e.g., RRC message) or MAC-CE or L1 message The configuration of the Rx mode is useful in the 5G wireless systems. 5G system in mmWave frequency band would be multi-beam based system. Both gNB and UE would be hybrid beamforming and multi-beam based system. The beam management procedure, beam state information measurement and reporting and the beam indication mechanism would be the essential features in 5G system. The configuration of Rx mode would be very useful and necessary feature to those operations for beam.

The UE needs to select one of those Rx modes to receive the downlink transmission. In order to enable the selection, the gNB needs to configure the UE to measure and report the beam state information (BSI) with respect to one or more Rx modes. Based on the measurement and reporting, the gNB and/or the UE can decide on the Rx mode selection. The gNB can indicate which Rx mode the UE may use to receive one or more physical downlink channels. In one example, the gNB can indicate one Rx mode for PDCCH channel and another Rx mode for PDSCH channel. The gNB can also configure the UE to cycle multiple Rx modes on one particular physical channel. In one example, the gNB can configure the UE to cycle the Rx modes over a set of OFDM symbols for receiving PDCCH. In this manner, some beam direction diversity can be achieved, which is beneficial to combat the signal blockage in mmWave frequency band.

Figure 18:
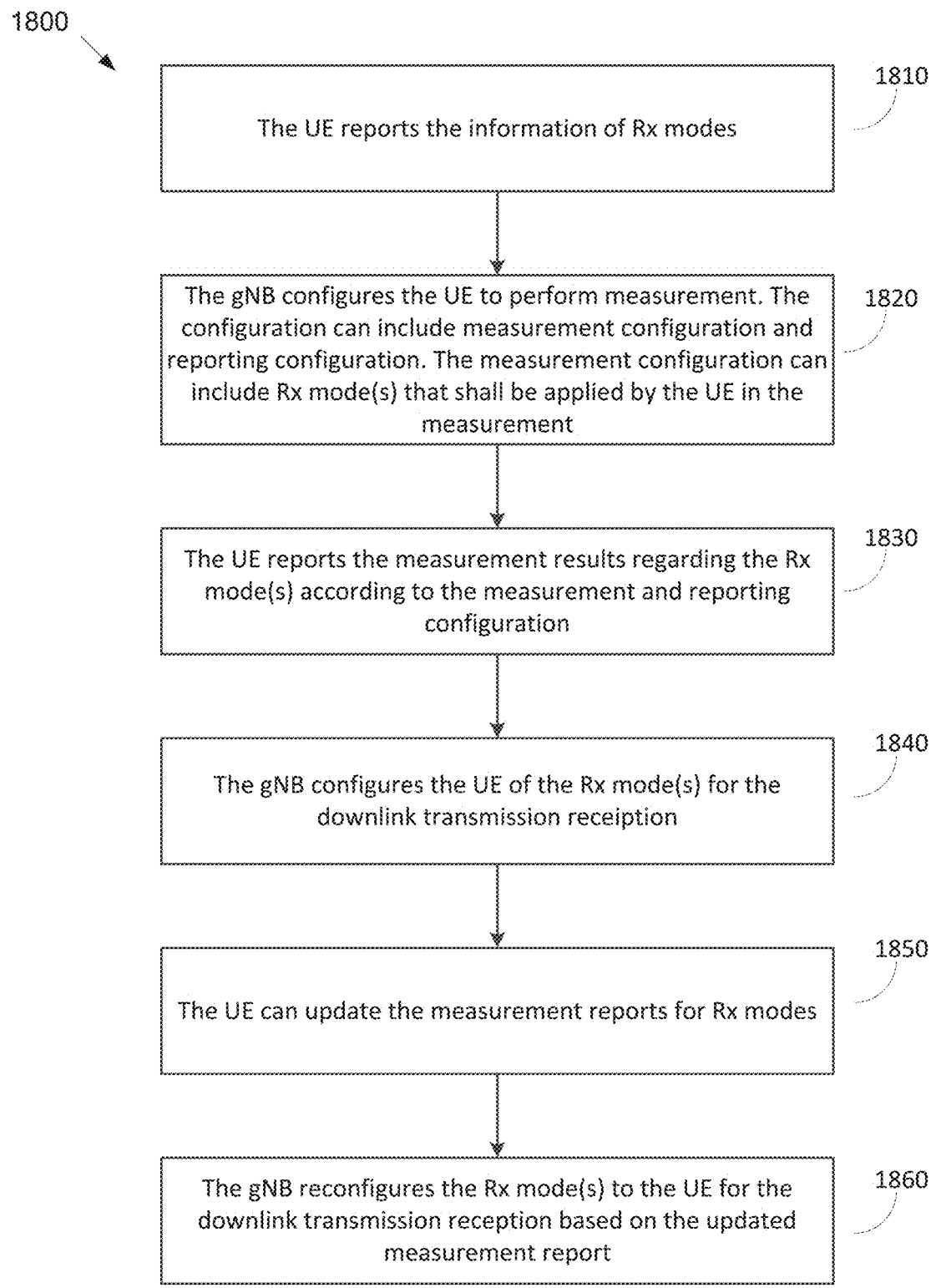
FIG. 18 illustrates a flow chart of a method for Rx mode operation according to embodiments of the present disclosure.

FIG. 18 illustrates a flow chart of a method for Rx mode operation 1800 according to embodiments of the present disclosure, as may be performed by a UE. An embodiment of the Rx mode operation 18000 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

An example of the procedure of Rx mode is shown in FIG. 18. As illustrated in FIG. 18, the UE first reports the information of Rx modes in 1810. The information of Rx modes can include number of Rx modes, ID of Rx modes, the information of spatial relationship and priority of Rx modes, as discussed above. Then in 1820, the gNB can configure the UE to perform measurement based on some Rx modes. The measurement and reporting configuration can include the information of Rx modes which may be applied by the UE in the measurement. The measurement the UE to perform can be, e.g., the measurement of beam-specific RSRP, the RRM (radio resource management) measurement, the CSI measurement.

After the measurement, the UE reports the measurement results to the gNB as configured in 1830. Based on the reporting from the UE, the gNB can configure the Rx mode(s) to the UE and the UE is configured to use the indicated Rx mode(s) to receive the downlink transmission in 1840. The UE can update the measurement based on the measurement configuration and reports the updated measurement to the gNB in 1850 and then the gNB configures updated Rx mode(s) to the UE for the downlink transmission reception in 1860.

As shown in FIG. 18, at step 1, a UE reports Rx modes capability. At step 2, a gNB configures UE to perform measurement (RRM or CSI) and measurement configuration includes Rx mode(s) to be applied by the UE for measurement. At step 3, a UE reports measurement per Rx mode according to measurement configuration. At step 4, a gNB configures UE the Rx mode(s) to receive DL transmissions (physical channels). At step 5, a UE updates measurement reports for Rx modes. At step 6, a gNB reconfigures the Rx mode according the updated measurement report.

In one embodiment, the information of Rx mode of the UE can be reported to the gNB implicitly. In one embodiment, the UE reports the number of repetitions for TRP Tx beam in the reference signal that is used by the UE for the measurement. In one example of CSI-RS used for beam management, one CSI-RS resource can have multiple time units and each time unit has multiple sub-time units. In the case of TX beams are swept over time units, the Tx beams can be repeated over the sub-time units within one time unit. The UE can report the requested number of sub-time unit for the CSI-RS resource which is going to be configured to the UE for beam management measurement and reporting. In the case of Tx beams are swept over sub-time units but repeated over time units, the UE can report the requested number time units in the CSI-RS resource that is going to be configured to the UE for the beam measurement and reporting. Based on the UE reporting, the gNB can know the information of Rx mode implicitly.

In multi-beam based 5G wireless systems, the gNB and the UE need to select the TRP Tx beam(s) and UE receiver beam(s) to be used for the transmission of downlink channel, including PDCCH and PDSCH. To assist with the beam selection, the gNB can transmit some downlink reference signal for beam management. The examples of downlink reference signal for beam management can be NR-SSS, BRS (beam reference signal), BMRS (beam measurement reference signal or beam management reference signal), MRS (measurement reference signal), MRS (mobility reference signal) and/or CSI-RS. By measuring the downlink reference signal, the UE can not only measure the quality of TRP Tx beam but also measure the quality of receive beams, i.e., Rx mode, to assist the selection of TRP Tx beam and Rx mode for downlink physical channel transmission and reception.

The beam state information can be the RSRP of one reference signal resource with assuming the UE using one Rx mode to receive this reference signal resource. This reference signal resource can correspond to one TRP Tx beam, which can be identified by a beam ID. The beam ID of one TRP Tx beam can be identified by the ID of e.g., reference signal resource, reference signal port, the OFDM symbol index in reference signal, reference signal cyclic shift (CS), a combination of reference signal port and OFDM symbol index, and/or the combination of reference signal port and OFDM symbol index and the slot index.

In some embodiment, one or more TRP Tx beam ID and one or more RX modes can be signaled to the UE and the UE can be configured to measure and report the beam state information for the configured TRP Tx beams and configured Rx modes. The configuration of Rx mode for UE to measure and report the beam state information based on one particular reference signal for beam management can be signaled through high layer signaling (for example RRC message) and/or L2 signaling (e.g., MAC-CE) and/or L1 signaling (e.g., DCI).

There are multiple different methods of UE using TRP Tx beams and Rx modes to measure and report the beam state information. Some examples are listed here and will be discussed in detail in the following sections.

In some embodiments, the UE is configured to measure/report the beam state information of one particular TRP Tx beam being measured with respect to multiple configured Rx modes. In some embodiments, the UE is configured to measure/report the beam state information of one particular TRP Tx beam being measured with respect to all the Rx modes that the UE can choose. In some embodiments, the UE is configured to measure/report the beam state information of one particular TRP Tx beam being with respect to one indicated Rx modes.

In some embodiments, the UE is configured to measure and report the beam state information of all the TRP Tx beams being measured with respect to one or more configured Rx modes. In some embodiments, the UE is configured to measure and report the beam state information of one or more pairs of TRP Tx beam-Rx mode indicated by the network. In some embodiments, the UE is configured to measure and report the beam state information of one or more TRP Tx beams being measured with respect to one particular Rx mode indicated by the network. In some embodiments, the UE is configured to measure the report the beam state information based on one or more configured TRP Tx beams and one or more configured Rx modes.

In some embodiments, the UE is configured to measure and report the beam state information of one or more configured TRP Tx beams being measured with respect to all the Rx beams that can be chosen by the UE. In some embodiments, the UE is configured to measure and report the beam state information with the measurement on all the TRP Tx beams and all the Rx modes.

In some embodiments, the UE can be configured to measure and report the beam state information of one TRP Tx beam and one UE Rx mode; the UE is configured with a TRP Tx beam and an Rx mode for this purpose. In such embodiments, the UE is configured to measure the RSRP of reference signal resource that corresponds to the configured TRP Tx beam using the configured Rx mode. This method is useful for the gNB and the UE to monitor the beam link quality of one particular pair of a TRP Tx beam and a Rx mode; for example, the gNB can configure the UE to measure the beam link quality of a new pair of TRP Tx beam and Rx mode to determine whether to switch to this new pair of beams for the downlink transmission. In one example, the gNB can configure the UE to measure and report such beam state information based on measuring reference signal that can convey multiple TRP Tx beams (e.g., cell-specific RS for beam management). The measurement and reporting configuration signaled to the UE can include one or more of: the information of one TRP Tx beam ID; or One Rx mode ID. In another example, the gNB can configure for the UE to report such beam state information based on measuring some reference signal that conveys only one TRP Tx beam (e.g., the UE-specific CSI-RS for beam management). In such a case, the measurement and reporting configuration to the UE can include one Rx mode ID only (TRP Tx beam ID configuration is not necessary).

In some embodiments, the UE can be configured to measure and report the beam state information of one TRP Tx beam and a set of indicated UE Rx modes. In such embodiments, one TRP Tx beam and a set of UE Rx modes are indicated to the UE. Then, the UE measures the RSRP of reference signal resource corresponding to the indicated TRP Tx beam ID by assuming using each indicated Rx mode in the configured set of UE Rx modes. In one example, the UE is configured with one Tx beam ID $B_{TX}$ and a set of $N_R$ Rx mode IDs $\{R_1, R_2, \ldots, R_{N_R}\}$. Then the UE is configured to measure the RSRP of reference signal resource (corresponding to Tx beam $B_{TX}$) by assuming receiving this reference signal resource with each of these Rx modes $\{R_1, R_2, \ldots, R_{N_R}\}$. The UE can obtain $N_R$ beam RSRP corresponding to each indicated Rx mode. The UE can be configured to report all these $N_R$ beam RSRPs in beam state information. Alternatively, the UE can be configured to report the largest $1 \leq N_{report} \leq N_R$ RSRPs and the corresponding Rx mode IDs which generate those largest RSRPs. This method is useful for the gNB and UE to refine selection of Rx modes with respect to one particular TRP Tx beam. In one example, the gNB can configure the UE to report such beam state information based on measuring reference signal that can convey multiple TRP Tx beams (e.g., cell-specific RS for beam management). The measurement and reporting configuration signaled to the UE can include one or more of: the information of one TRP Tx beam ID; number of configured Rx modes, $N_R$; or alternatively a set of Rx mode IDs $\{R_1, R_2, \ldots, R_{N_R}\}$. When the number of configured Rx modes $N_R$ is configured, a set of Rx mode IDs becomes $\{0, 1, \ldots, N_R-1\}$; or Number of beam RSRPs to report, $N_{report}$. In another example, the gNB can configure for the UE to report such beam state information based on measuring some reference signal that conveys only one TRP Tx beam (e.g., the UE-specific CSI-RS for beam management). In such a case, the measurement and reporting configuration to the UE can include a set of Rx mode IDs $\{R_1, R_2, \ldots, R_{N_R}\}$ and number of configured Rx modes, $N_R$ and the number of reported beam RSRP, $N_{report}$.

In some embodiments, the UE can be configured to measure and report the beam state information of one TRP Tx beam and the UE is configured to use all available Rx modes. In such embodiments, the UE is configured to measure the RSRP of reference signal resource corresponding to the indicated TRP Tx beam. The UE is configured to choose each of all the Rx mode(s) to receive this reference signal resource and calculate the RSRP. For example, the UE can determine a set of $N_R$ Rx mode IDs $\{R_1, R_2, \ldots, R_{N_R}\}$, which can be e.g., $\{0, 1, \ldots, N_R-1\}$. Then the UE calculates $N_R$ beam RSRP of this reference signal resource by assuming using each of the Rx mode in set $\{R_1, R_2, \ldots, R_{N_R}\}$. The UE can be configured to report largest $N_{report} \geq 1$ RSRP and the corresponding Rx mode IDs. In one example, the gNB can configure the UE to report such beam state information based on measuring reference signal that can convey multiple TRP Tx beams (e.g., cell-specific RS for beam management). The measurement and reporting configuration signaled to the UE can include one or more of: the information of one TRP Tx beam ID; Number of beam RSRPs to report, $N_{report}$; or 1-bit information to indicate the UE to choose Rx mode by itself. This 1-bit information can be implicitly indicated by absence of the Rx mode information in configuration signaling. This 1-bit information can also be explicitly signaled. In another example, the gNB can configure the UE to report such beam state information based on measuring reference signal that conveys only one TRP Tx beam. In this example, the measurement and reporting configuration to the UE can include the number of reported beam RSRP, $N_{report}$, and 1-bit information to indicate the UE to choose the Rx mode by itself.

In some embodiments, the UE can be configured to measure and report the beam state information with one or more indicated Rx modes. In such embodiments, the UE can be configured with one or more Rx modes $\{R_1, R_2, \ldots, R_{N_R}\}$. The UE can be configured to measure the RSRP of all the reference signal resources in the reference signal for beam management (e.g., BRS, BMRS or CSI-RS) with each Rx mode in the configured set $\{R_1, R_2, \ldots, R_{N_R}\}$. Then for each indicated Rx mode, the UE can obtain multiple RSRP corresponding to different TRP Tx beams. The UE can be configured to report one or more of the following: for each indicated Rx mode in set $\{R_1, R_2, \ldots, R_{N_R}\}$, the UE reports the largest RSRP and corresponding TRP Tx beam ID; and the UE reports the largest $N_{report} \geq 1$ RSRP among all the RSRPs of all the combinations of TRP Tx beam and Rx modes in configured set $\{R_1, R_2, \ldots, R_{N_R}\}$. The UE can also report the corresponding TRP Tx beam ID and corresponding Rx mode in the configured Rx mode set $\{R_1, R_2, \ldots,$ $R_{N_R}$} for each reported RSRP. The beam measurement and reporting configuration signaled to the UE can include one or more of: the identity (identities) of reference signal (resources) used for the beam measurement and reporting; number of configured Rx modes, $N_R$; or alternatively a set of configured Rx mode {$R_1, R_2, \ldots, R_{N_R}$}. When the number of configured Rx modes $N_R$ is configured, a set of Rx mode IDs becomes {0, 1, ..., $N_R-1$}. The number of beam RSRP is reported, $N_{report}$; Reporting mode.

In some embodiments, the UE can be configured to measure and report the beam state information for one or more pairs of a TRP Tx beam and a UE Rx mode indicated by the network. In such embodiments, the UE can be configured with one or more TRP Tx beam—Rx mode pairs $S_i = \{B_{TX,i}, R_i\}$. The UE is configured to measure the RSRP of reference signal resource corresponding to each Tx beam ID $B_{TX,i}$ by assuming using the associated Rx mode $R_i$ in the indicated pair to receive this reference signal resource. The UE can be configured to report $N_{report} \geq 1$ largest beam RSRPs and the indices of Tx-Rx pair that generate each of those RSRPs. This method is useful when gNB wants to monitor a few particular Tx-Rx beam pairs and in case of blockage, the gNB can switch to one of those monitored Tx-Rx beam pairs. The measurement and reporting configuration signaled to the UE can include: one or more Tx-Rx pairs of TRP Tx beam ID and Rx mode ID $S_i = \{B_{TX,i}, R_i\}$; and Number of beam RSRPs to report, $N_{report}$.

In some embodiments, the UE can be configured to measure and report the beam state information of multiple TRP Tx beams being received with one particular Rx mode indicated by the network. In such embodiments, the UE can be configured with $M_{TX}$ TRP Tx beams {$B_{Tx,1}, B_{TX,1}, \ldots, B_{TX,M_{TX}}$} and one Rx mode $R_1$. The UE is configured to measure the RSRP of reference signal resource corresponding to each TRP Tx beam in the configured set {$B_{Tx,1}, B_{TX,1}, \ldots, B_{TX,M_{TX}}$} by assuming using the configured Rx mode $R_1$ to receive each reference signal resource. The UE obtains totally $M_{TX}$ beam RSRPs for the configured TRP Tx beams. The UE can be configured to report all these $M_{TX}$ beam RSRPs to the network. The UE can be configured to report the largest $N_{report} \geq 1$ RSRPs and corresponding TRP Tx beam IDs. This method is useful for the gNB and UE to refine the selection of TRP Tx beam with respect to one particular Rx mode. The gNB can choose the best TRP Tx beam for the particular Rx mode based on the beam state information report. The gNB can also determine the TRP Tx beam switching and changing based on the beam state information reporting without indicating the UE to change the Rx mode. The measurement and reporting configuration can include one or more of the followings: a subset of TRP Tx beam IDs {$B_{Tx,1}, B_{TX,1}, \ldots, B_{TX,M_{TX}}$}; one UE Rx mode $R_1$; and number of beam RSRPs to report, $N_{report}$.

In some embodiments, the UE can be configured to measure and report the beam state information with one or more indicated TRP Tx beam IDs and one or more indicated UE Rx modes. A subset of TRP Tx beams {$B_{Tx,1}, B_{TX,1}, \ldots, B_{TX,M_{TX}}$} a subset of UE Rx mode {$R_1, R_2, \ldots, R_{N_R}$} are indicated to the UE. The UE can measure the RSRP of reference signal resource corresponding to each TRP Tx beam in {$B_{Tx,1}, B_{TX,1}, \ldots, B_{TX,M_{TX}}$} using each of the Rx mode in the indicated Rx mode subset {$R_1, R_2, \ldots, R_{N_R}$}. The UE can obtain totally $B_{TX,M_{TX}} \times R_{N_R}$ RSRPs for all the combination between each of the configured TRP Tx beams and each of the configured Rx modes. The UE can report one or more of the followings. In one example, for each indicated Rx mode in set {$R_1, R_2, \ldots, R_{N_R}$}, the UE reports the largest RSRP and corresponding TRP Tx beam ID in {$B_{Tx,1}, B_{TX,1}, \ldots, B_{TX,M_{TX}}$}. In another example, for each indicated Tx mode in set {$B_{Tx,1}, B_{TX,1}, \ldots, B_{TX,M_{TX}}$}, the UE reports the largest RSRP and corresponding UE Rx mode in indicated set {$R_1, R_2, \ldots, R_{N_R}$}. In yet another example, the UE reports the largest $N_{report} \geq 1$ RSRP among all the RSRPs of all the combinations of TRP Tx beam in the subset {$B_{Tx,1}, B_{TX,1}, \ldots, B_{TX,M_{TX}}$} and Rx modes in configured set {$R_1, R_2, \ldots, R_{N_R}$}. The UE can also report the corresponding TRP Tx beam ID and corresponding Rx mode in the configured Rx mode set {$R_1, R_2, \ldots, R_{N_R}$} for each reported RSRP.

The aforementioned embodiments are useful for the gNB and UE to align the Tx and Rx beam among a subset of Tx and Rx beams. The UE can be configured to report the beam state information of all the combinations of each configured TRP Tx beam and each configured Rx modes. The UE can be configured to report the largest $N_{report} \geq 1$ RSRPs and the corresponding TRP Tx beam and corresponding UE Rx mode. The measurement and reporting configuration can include one or more of the followings: a subset of TRP Tx beam IDs {$B_{Tx,1}, B_{TX,1}, \ldots, B_{TX,M_{TX}}$}; number of configured Rx modes, $N_R$ (or alternatively a set of configured Rx mode {$R_1, R_2, \ldots, R_{N_R}$}, when the number of configured Rx modes $N_R$ is configured, a set of Rx mode IDs becomes {0, 1, ..., $N_R-1$}; the information of reporting mode: e.g., reporting all the RSRP, or reporting the largest RSRPs; and number of reported beam RSRP, $N_{report}$.

In some embodiments, the UE can be configured to measure and report the beam state information based on measuring one or more configured TRP Tx beams and all the UE Rx mode. A subset of TRP Tx beams {$B_{Tx,1}, B_{TX,1}, \ldots, B_{TX,M_{TX}}$} is indicated to the UE. The UE can measure the RSRP of reference signal resource corresponding to each TRP Tx beam in {$B_{Tx,1}, B_{TX,1}, \ldots, B_{TX,M_{TX}}$} by using each of all the Rx mode. The UE can obtain totally $B_{TX,M_{TX}} R_{Rx}$ RSRPs for all the combination between each of the configured TRP Tx beams and each of the Rx modes, where $R_{Rx}$ is the total number of all Rx modes. The UE can report at least one of the followings. In one example, for each indicated Tx mode in set {$B_{Tx,1}, B_{TX,1}, \ldots, B_{TX,M_{TX}}$}, the UE reports the largest RSRP and corresponding UE Rx mode. In another example, the UE reports the largest $N_{report} \geq 1$ RSRP among all the RSRPs of all the combinations of TRP Tx beam in the subset {$B_{Tx,1}, B_{TX,1}, \ldots, B_{TX,M_{TX}}$} and Rx modes. The UE can also report the corresponding TRP Tx beam ID and corresponding Rx mode for each reported RSRP. The aforementioned embodiments are useful for the gNB and UE to refine the TRP Tx beams among a subset of Tx beams. The gNB can refine a few Tx beam over all the UE Rx modes and then select the best Tx beams. The measurement and reporting configuration can include one or more of the followings: a subset of TRP Tx beam IDs {$B_{Tx,1}, B_{TX,1}, \ldots, B_{TX,M_{TX}}$}; the information of reporting mode (e.g., reporting all the RSRP, or reporting the largest RSRPs); and number of reported beam RSRP, $N_{report}$.

In some embodiments, the UE can be configured to measure and report the beam state information based on measuring all the TRP Tx beams and all the UE Rx modes. In such embodiments, the UE can be configured to use each of all the Rx mode to receive and measure the RSRP of each of the reference signal resources in the configured the reference signal for beam management. In this manner, the UE can obtain the RSRP of beam pair of each TRP Tx beam and each Rx mode. The UE can be configured to report one or more of: all the RSRP of all the pair of TRP Tx beam and Rx mode; the largest RSRP of all TRP Tx beams (e.g., the UE can measure the RSRP of one TRP Tx beam with respect to multiple Rx modes and the UE is configured to report the largest RSRP for each TRP Tx beams); the largest $N_{report}$ of largest RSRP of all TRP Tx beams; the largest RSRP of all Rx modes (e.g., the UE can measure the RSRP of multiple TRP Tx beams with respect to one Rx mode The UE is configured to report the largest RSRP of each Rx mode); and the largest $N_{report}$ of largest RSRP of all Rx modes. The aforementioned embodiments are useful for the gNB and UE to measure all the Tx beam and all the Rx beam to obtain the initial beam alignment.

In multi-beam based system, the UE needs to know using which Rx mode (or Rx beams) to receive the downlink transmission including PDCCH and PDSCH. In some embodiment, one or more Rx modes are signaled to the UE, which may be used for the reception of downlink transmission, PDCCH and/or PDSCH. The Rx modes can be signaled implicitly or explicitly. The Rx modes can be signaled through high layer signaling (e.g., RRC message), MAC-CE and/or L1 signaling (e.g., DCI). In one example, the gNB signals one Rx mode to the UE and configure the UE to use this configured Rx mode to receive one downlink channel. The signaling can include the following: the ID of Rx mode; the slot offset information, the slot index where the UE may begin to use the indicated Rx mode; and the information on downlink channel on which the UE may apply the indicated Rx mode. In one example, the gNB can indicate the UE that one Rx mode is used for PDCCH reception. The gNB can indicate the UE that one Rx mode may be used for the PDSCH reception. The gNB can indicate one Rx mode that the UE may use for the reception of both PDCCH and PDSCH.

In one example, the Rx mode is signaled implicitly and the UE may use the Rx mode that correspond to one particular RSRP reported in the beam state information reporting for the reception of PDCCH and/or PDSCH. In one example, in the beam measurement and reporting configuration, the gNB can also indicate the UE that the UE may use the Rx mode corresponding to the first RSRP report for the downlink reception. The channel information, e.g., PDCCH or/and PDSCH can be signaled in the measurement and reporting configuration message.

Figure 19:
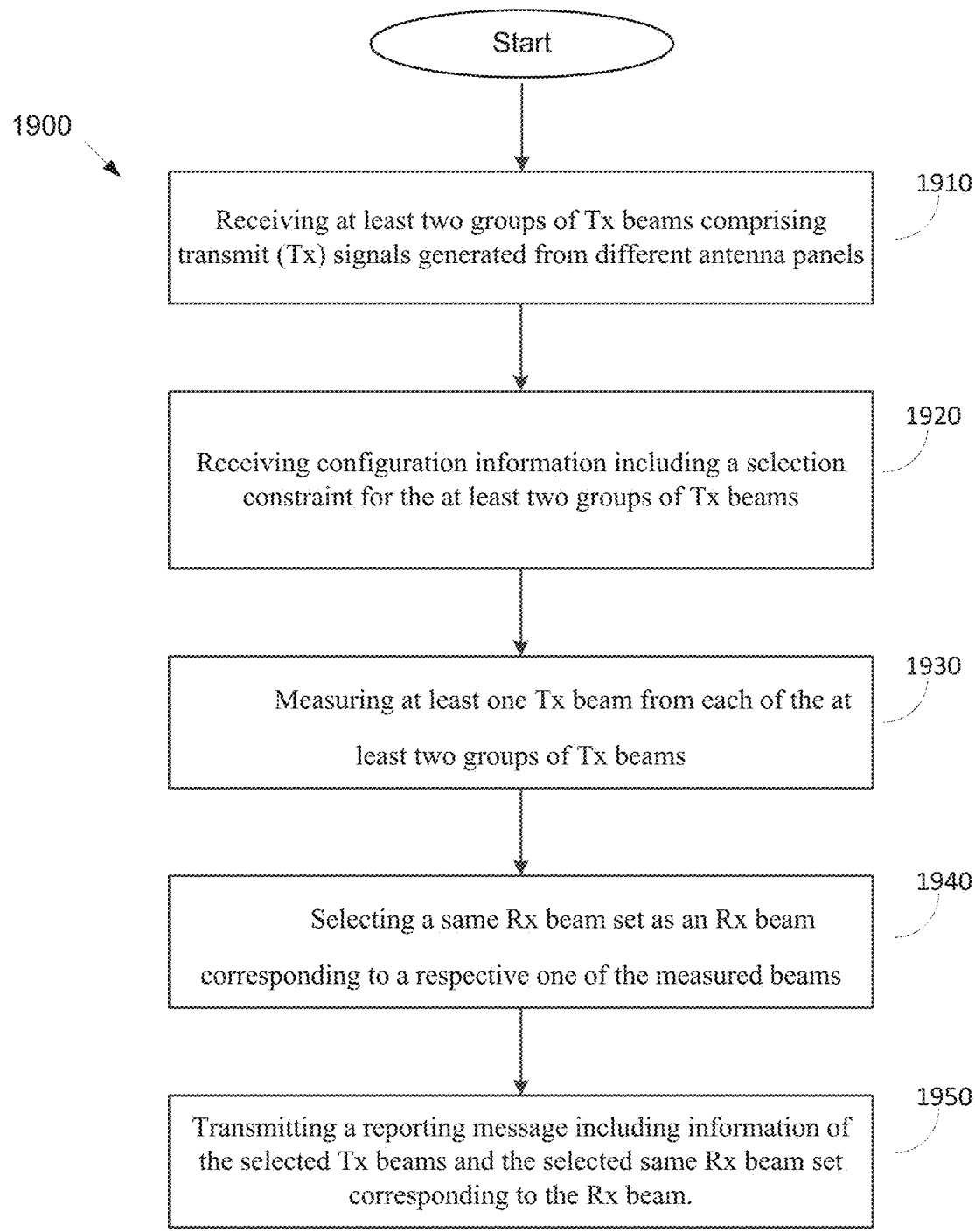
FIG. 19 illustrates a flow chart of a method for beam management according to embodiments of the present disclosure.

FIG. 19 illustrates a flow chart of a method 1900 for beam management according to embodiments of the present disclosure, as may be performed by a UE. An embodiment of the flow chart of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 19, the method 1900 for beam management begins at step 1910. In step 1910, the UE receives, from a base station (BS), at least two groups of Tx beams comprising transmit (Tx) signals generated from different antenna panels. In some embodiments, each Tx beam of the at least two groups of Tx beams correspond to different antenna panel, respectively. In some embodiments, each beam of the at least two groups of Tx beams is received on the same OFDM symbol. In some embodiments, the UE, at step 1920, receives the Tx signals included in the at least two groups of Tx beams from at least two transmission and reception points (TRPs) including multiple panels, respectively.

Subsequently, at step 1910, the at least two groups of Tx beams are transmitted through reference signals (RSs) from the BS. The UE, at step 1920, receives configuration information from the BS. The configuration information includes a selection constraint for the at least two groups of Tx beams.

Subsequently, the UE measures at least one Tx beam from each of the at least two groups of Tx beams at step 1930. At step 1930, the beam measurement is performed based on the configuration information that is received from the BS at step 1920. In some embodiment, the UE, at step 1930, measures the at least two groups of Tx beams based on the configuration information.

Next, the UE selects a same Rx beam set as an Rx beam at step 1940. The Rx beam corresponds to a respective one of the measured beams. In some embodiments, the Rx beam set comprises at least one Rx beam corresponding to at least one antenna penal or antenna array. Specifically, the selection at step 1940 is performed for each of the at least two groups of Tx beams. In some embodiments, the UE selects, at step 1940, the at least one beam from the at least two groups of Tx beams based on the selection constraint configured by at least one of network elements.

Finally, at step 1950, the UE transmits a reporting message including information of the selected Tx beams and the selected same Rx beam set corresponding to the Rx beam. In some embodiments, the UE, at step 1950, generates information associated with each of the at least two groups of Tx beams based on the configuration information received from the BS and transmits the reporting message including the information of each of the at least two groups of Tx beams. In some embodiments, the information includes different quality of the Tx signals corresponding to the serving group and the companion group, respectively. In some embodiments, the UE, at step 1950, transmits the reporting message including information of the Tx signals associated with at least one TRP. In such embodiments, a joint transmission (JT), a dynamic point selection (DPS), or an interference coordination is applied to the at least two TRPs.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for operating a user equipment (UE) in a wireless communication system, the method comprising:
receiving, from a base station (BS), configuration information regarding a channel state information (CSI) reporting, the configuration information configuring the UE to transmit report information for at least two transmit beams that are associated with a same receive beam of the UE; and
transmitting, to the BS, the report information, the report information based on the configuration information, the report information comprising first information for indicating a first of the two transmit beams and second information for indicating a second of the two transmit beams, wherein a receive beam of the UE is usable for receiving a first signal based on the first transmit beam and a second signal based on the second transmit beam.

2. The method of claim 1, wherein the first transmit beam and the second transmit beam are associated with the receive beam of the UE.

3. The method of claim 1,
wherein the first transmit beam and the second transmit beam are identified based on the configuration information.

4. The method of claim 1, further comprising:
receiving, from the BS, the first signal based on the first transmit beam; and
receiving, from the BS, the second signal based on the second transmit beam,
wherein a signal based on the first transmit beam and a signal based on the second transmit beam can be received by the UE at a same time unit based on the receive beam of the UE.

5. The method of claim 1, further comprising
transmitting, based on the configuration information to the BS, information comprising:
a reference signal received power (RSRP) value indicating a reference channel quality measured based on the first transmit beam, and
a differential RSRP value indicating a difference between the reference channel quality and a channel quality based on the second transmit beam.

6. The method of claim 5, wherein the first transmit beam is identified among a plurality of transmit beams of the BS, and
wherein the RSRP value is a largest value among a plurality of RSRP values for the plurality of transmit beams of the BS.

7. The method of claim 1, wherein a signal based on the first transmit beam and a signal based on the second transmit beam can be received at a same orthogonal frequency division multiplexing (OFDM) symbol based on the receive beam of the UE,
wherein the configuration information further comprises information for configuring the UE to transmit channel state information comprising a resource for indicating a transmit beam and a reference signal received power (RSRP), and
wherein the configuration information is transmitted via a radio resource control (RRC) signaling.

8. The method of claim 1, further comprising:
transmitting, to the BS, capability information for indicating whether the UE supports a reference signal received power (RSRP) reporting for at least two reference signals.

9. A method for operating a base station (BS) in a wireless communication system, the method comprising:
transmitting, to a user equipment (UE), configuration information regarding a channel state information (CSI) reporting, the configuration information configuring the UE to transmit report information for at least two transmit beams that are associated with a same receive beam of the UE; and
receiving, from the UE, the report information based on the configuration information, the report information comprising first information for indicating a first of the two transmit beams and second information for indicating a second of the two transmit beams,
wherein a receive beam of the UE is usable for receiving a first signal based on the first transmit beam and a second signal based on the second transmit beam.

10. The method of claim 9, wherein the first transmit beam and the second transmit beam are associated with the receive beam of the UE.

11. The method of claim 9, wherein the first transmit beam and the second transmit beam are identified based on the configuration information.

12. The method of claim 9, further comprising:
transmitting, to the UE, the first signal based on the first transmit beam; and
transmitting, to the UE, the second signal based on the second transmit beam,
wherein a signal based on the first transmit beam and a signal based on the second transmit beam can be received by the UE at a same time unit based on the receive beam of the UE.

13. The method of claim 9, further comprising
receiving, from the UE, information based on the configuration information, the information comprising:
a reference signal received power (RSRP) value indicating a reference channel quality measured based on the first transmit beam, and
a differential RSRP value indicating a difference between the reference channel quality and a channel quality based on the second transmit beam.

14. The method of claim 13, wherein the first transmit beam is identified among a plurality of transmit beams of the BS, and
wherein the RSRP value is a largest value among a plurality of RSRP values for the plurality of transmit beams of the BS.

15. The method of claim 9, wherein a signal based on the first transmit beam and a signal based on the second transmit beam can be received at a same orthogonal frequency division multiplexing (OFDM) symbol based on the receive beam of the UE,
wherein the configuration information further comprises information for configuring the UE to transmit channel state information comprising a resource for indicating a transmit beam and a reference signal received power (RSRP), and
wherein the configuration information is transmitted via a radio resource control (RRC) signaling.

16. The method of claim 9, further comprising:
receiving, from the UE, capability information for indicating whether the UE supports a reference signal received power (RSRP) reporting for at least two reference signals.

17. A user equipment (UE) in a wireless communication system, the UE comprising:
at least one transceiver; and
at least one processor operatively coupled to the at least one transceiver, and configured to:
receive, from a base station (BS), configuration information regarding a channel state information (CSI) reporting, the configuration information configuring the UE to transmit report information for at least two transmit beams that are associated with a same receive beam of the UE, and
transmit, to the BS, the report information based on the configuration information, the report information comprising first information for indicating a first of the two transmit beams and second information for indicating a second of the two transmit beams,
wherein a receive beam of the UE is usable for receiving a first signal based on the first transmit beam and a second signal based on the second transmit beam.

18. The UE of claim 17, wherein the first transmit beam and the second transmit beam are associated with the receive beam of the UE.

19. The UE of claim 17, wherein the first transmit beam and the second transmit beam are identified based on the configuration information.

20. The UE of claim 17, wherein the at least one processor is further configured to:
receive, from the BS, the first signal based on the first transmit beam; and
receive, from the BS, the second signal based on the second transmit beam,
wherein a signal based on the first transmit beam and a signal based on the second transmit beam can be received by the UE at a same time unit based on the receive beam of the UE.

21. The UE of claim 17, wherein the at least one processor is further configured to:
transmit, based on the configuration information to the BS, information comprising:
a reference signal received power (RSRP) value indicating a reference channel quality measured based on the first transmit beam, and
a differential RSRP value indicating a difference between the reference channel quality and a channel quality based on the second transmit beam.

22. The UE of claim 21, wherein the first transmit beam is identified among a plurality of transmit beams of the BS, and
wherein the RSRP value is a largest value among a plurality of RSRP values for the plurality of transmit beams of the BS.

23. The UE of claim 17, wherein a signal based on the first transmit beam and a signal based on the second transmit beam can be received at a same orthogonal frequency division multiplexing (OFDM) symbol based on the receive beam of the UE,
wherein the configuration information further comprises information for configuring the UE to transmit channel state information comprising a resource for indicating a transmit beam and a reference signal received power (RSRP), and
wherein the configuration information is transmitted via a radio resource control (RRC) signaling.

24. The UE of claim 17, wherein the at least one processor is further configured to:
transmit, to the BS, capability information for indicating whether the UE supports a reference signal received power (RSRP) reporting for at least two reference signals.

25. A base station (BS) in a wireless communication system, the BS comprising:
at least one transceiver; and
at least one processor operatively coupled to the at least one transceiver, and configured to:
transmit, to a user equipment (UE), configuration information regarding a channel state information (CSI) reporting, the configuration information configuring the UE to transmit report information for at least two transmit beams that are associated with a same receive beam of the UE, and
receive, from the UE, the report information based on the configuration information, the report information comprising first information for indicating a first of the two transmit beams and second information for indicating a second of the two transmit beams,
wherein a receive beam of the UE is usable for receiving a first signal based on the first transmit beam and a second signal based on the second transmit beam.

26. The BS of claim 25, wherein both of the first transmit beam and the second transmit beam are associated with the receive beam of the UE.

27. The BS of claim 25, wherein the first transmit beam and the second transmit beam are identified based on the configuration information.

28. The BS of claim 25, wherein the at least one processor is further configured to:
transmit, to the UE, the first signal based on the first transmit beam; and
transmit, to the UE, the second signal based on the second transmit beam,
wherein a signal based on the first transmit beam and a signal based on the second transmit beam can be received by the UE at a same time unit based on the receive beam of the UE.

29. The BS of claim 25, wherein the at least one processor is further configured to:
receive, from the UE, information based on the configuration information, the information comprising:
a reference signal received power (RSRP) value indicating a reference channel quality measured based on the first transmit beam, and
a differential RSRP value indicating a difference between the reference channel quality and a channel quality based on the second transmit beam.

30. The BS of claim 29, wherein the first transmit beam is identified among a plurality of transmit beams of the BS, and
wherein the RSRP value is a largest value among a plurality of RSRP values for the plurality of transmit beams of the BS.

31. The BS of claim 25, wherein a signal based on the first transmit beam and a signal based on the second transmit beam can be received at a same orthogonal frequency division multiplexing (OFDM) symbol based on the receive beam of the UE,
wherein the configuration information further comprises information for configuring the UE to transmit channel state information comprising a resource for indicating a transmit beam and a reference signal received power (RSRP), and
wherein the configuration information is transmitted via a radio resource control (RRC) signaling.

32. The BS of claim 25, wherein the at least one processor is further configured to:
receive, from the UE, capability information for indicating whether the UE supports a reference signal received power (RSRP) reporting for at least two reference signals.

* * * * *